(12) United States Patent
Sone et al.

(10) Patent No.: US 7,273,672 B2
(45) Date of Patent: Sep. 25, 2007

(54) SOLID POLYMER ELECTROLYTE FUEL CELL

(75) Inventors: Yoshitsugu Sone, Tsukuba (JP); Mitsushi Ueno, Tsukuba (JP); Saburou Kuwashima, Tsukuba (JP)

(73) Assignee: Japan Aerospace Exploration Agency, Tsukuba-Shi, Ibaraki (JP)

( * ) Notice: Subject to any disclaimer, the term of this patent is extended or adjusted under 35 U.S.C. 154(b) by 405 days.

(21) Appl. No.: 10/386,470

(22) Filed: Mar. 13, 2003

(65) Prior Publication Data

US 2003/0198851 A1    Oct. 23, 2003

(30) Foreign Application Priority Data

Apr. 23, 2002 (JP) ............................. 2002-120687

(51) Int. Cl.
*H01M 2/14* (2006.01)
(52) U.S. Cl. .................. 429/39; 429/38; 202/183; 62/495; 62/183; 62/181; 62/478
(58) Field of Classification Search .................. 429/20, 429/13, 39, 38; 202/183, 163; 62/495, 183, 62/181, 478, 485, 476
See application file for complete search history.

(56) References Cited

U.S. PATENT DOCUMENTS

| | | | |
|---|---|---|---|
| 3,615,850 A * | 10/1971 | Chludzinski et al. | 429/17 |
| 4,582,765 A | 4/1986 | Kothmann | |
| 4,696,871 A * | 9/1987 | Pinto | 429/17 |
| 5,773,169 A | 6/1998 | Wilkinson et al. | |
| 5,853,910 A | 12/1998 | Tomioka et al. | |
| 6,207,306 B1 * | 3/2001 | Sederquist | 429/17 |
| 6,207,312 B1 * | 3/2001 | Wynne et al. | 429/34 |
| 6,673,482 B2 * | 1/2004 | Imazeki et al. | 429/26 |

| | | |
|---|---|---|
| 2002/0011335 A1 | 1/2002 | Zhang et al. |

FOREIGN PATENT DOCUMENTS

| | | |
|---|---|---|
| JP | 9-266002 A | 10/1997 |
| JP | 09266002 A | 10/1997 |
| JP | 11-185783 A | 7/1999 |
| JP | 11185783 A | 7/1999 |
| JP | 2001-6698 A | 1/2001 |
| JP | 2001006698 A | 1/2001 |
| JP | 2001-185172 A | 7/2001 |
| JP | 2001185172 A | 7/2001 |
| WO | WO 01/93976 A2 | 12/2001 |

* cited by examiner

*Primary Examiner*—Patrick Joseph Ryan
*Assistant Examiner*—Ben Lewis
(74) *Attorney, Agent, or Firm*—Jacobson Holman PLLC

(57) ABSTRACT

The present invention provides a solid polymer electrolyte fuel cell comprising a fuel cell stack 21 formed by laminating a plurality of fuel cell units each of which includes a fuel electrode 23, an oxidant electrode 24, and a solid polymer electrolyte membrane 22 interposed between the fuel and oxidant electrodes. The fuel cell unit is operable to generate an electric power through an electrochemical reaction between a first gas supplied to the side of the fuel electrode 23 and a second gas supplied to the side of the oxidant electrode 24. In this fuel cell, the first gas supplied to the side of the fuel electrode 23 and the second gas supplied to the side of the oxidant electrode 24 are adapted to flow generally in opposite directions in the fuel cell stack 21, so that a water created on the side of oxidant electrode 24 is reciprocally moved between the fuel electrode 23 and the oxidant electrode 24 to increase a water holding region in the solid polymer electrolyte membrane 22. The fuel cell of the present invention can improve fuel cell characteristics without providing any humidifier.

4 Claims, 20 Drawing Sheets

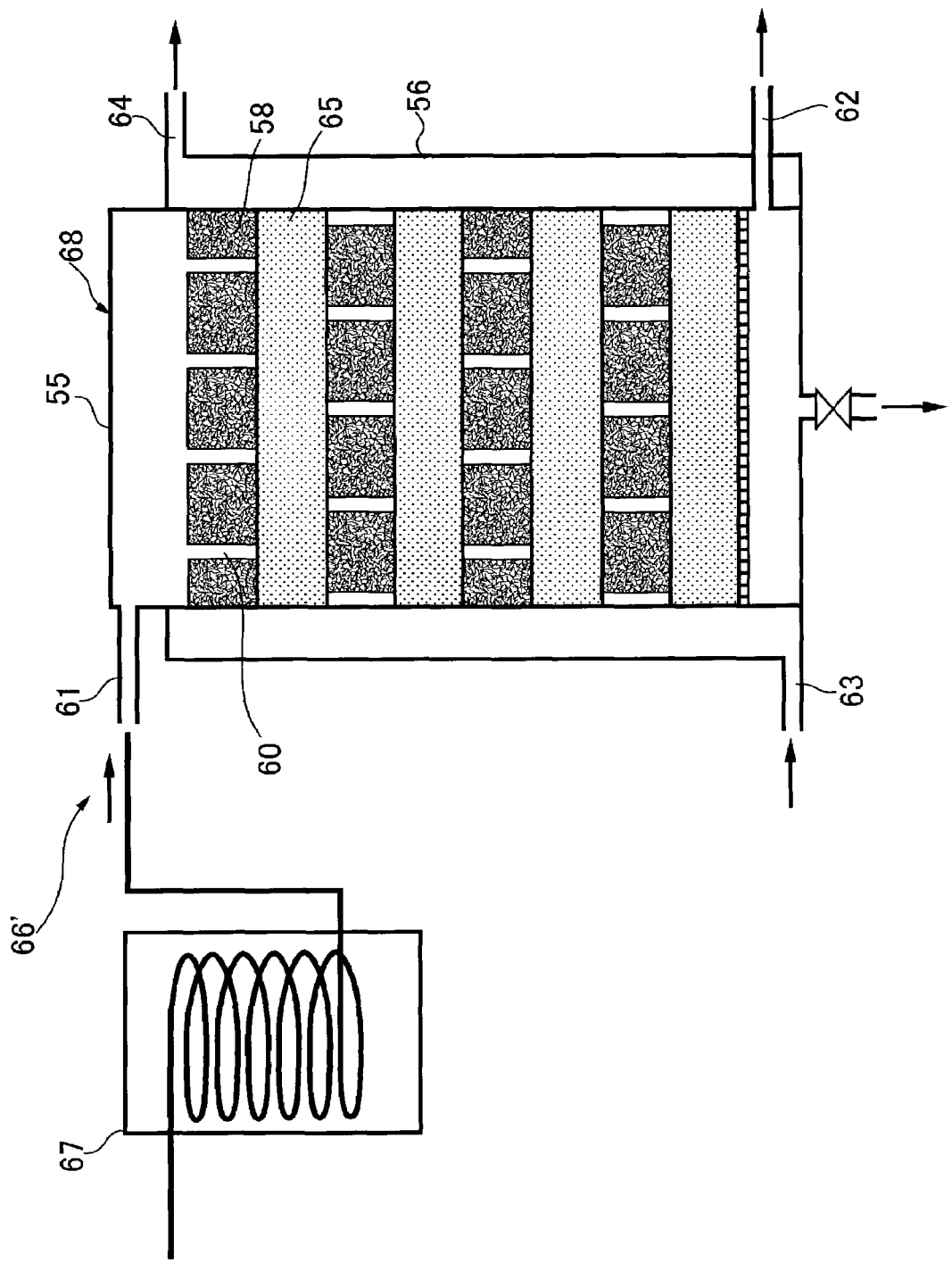

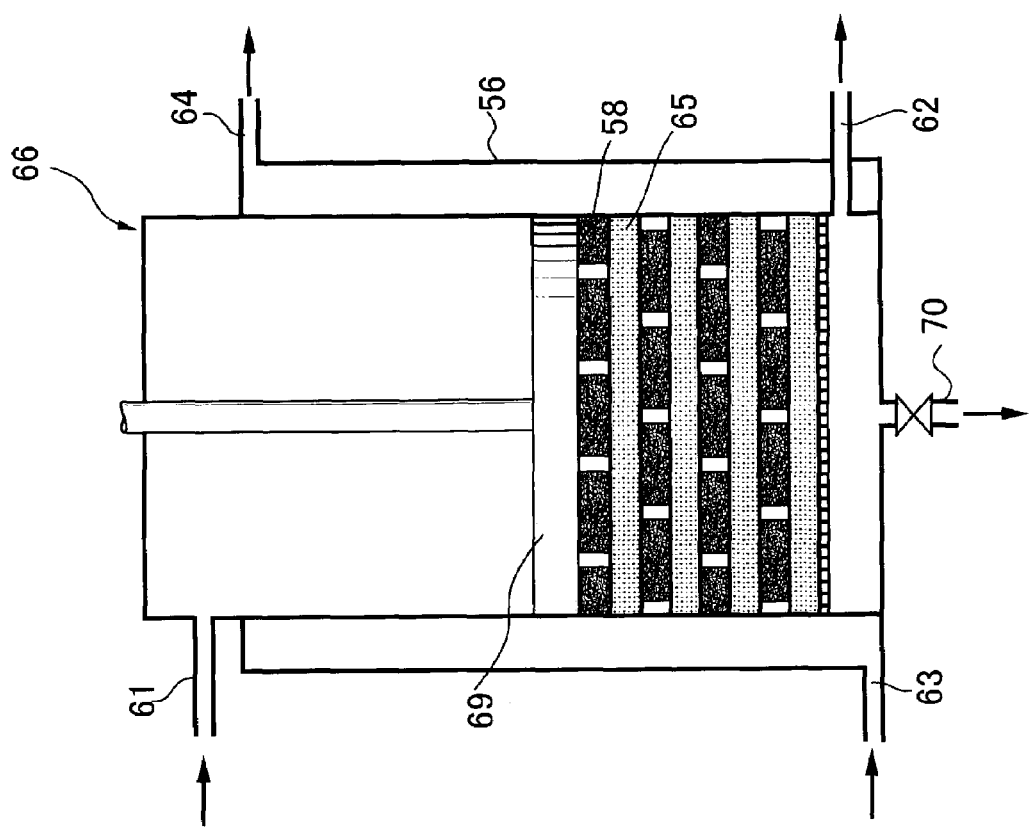
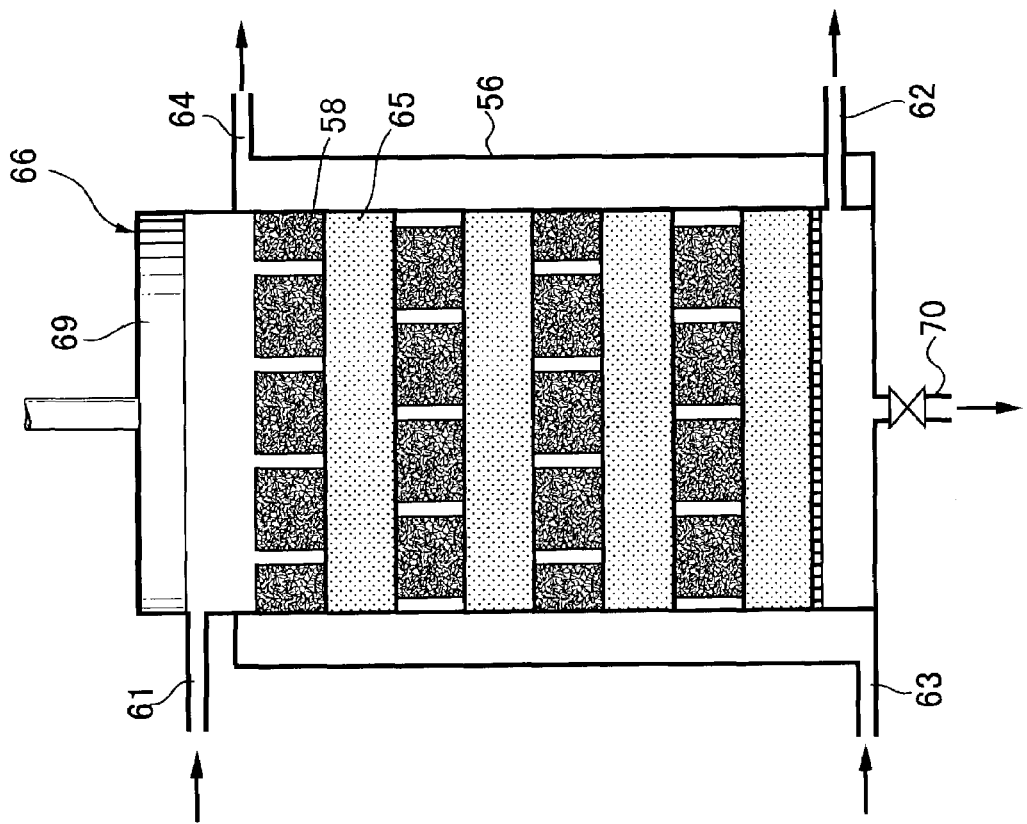

US 7,273,672 B2

SOLID POLYMER ELECTROLYTE FUEL CELL

FIELD OF THE INVENTION

The present invention relates to a solid polymer electrolyte fuel cell operable to cause an electrochemical reaction between a first gas on the side of a fuel electrode and a second gas on the side of an oxidant electrode through a solid polymer electrolyte membrane so as to generate an electric power.

BACKGROUND OF THE INVENTION

A fuel cell is intended to cause an electrochemical reaction between a fuel such as a hydrogen gas and an oxidant such as air (oxygen gas) so as to convert a chemical energy of the fuel directly into an electric energy. Among various fuel cells, a solid polymer electrolyte fuel cell has excellent characteristics such as high power density, structural simplicity, and relatively low operating temperature, and thereby its technical development has been increasingly driven forward.

FIG. 21 shows one example of conventional solid polymer electrolyte fuel cells to be used on the ground. This solid polymer electrolyte fuel cell comprises a fuel cell stack including a solid polymer electrolyte membrane 1, fuel and oxidant electrodes 2, 3 disposed to sandwiching the solid polymer electrolyte membrane 1 therebetween, a hydrogen supply port 5 provided on the upper side of the fuel electrode 2, and an air (oxygen gas) supply port 6 provided on the upper side of the oxidant electrode 3. In the solid polymer electrolyte fuel cell, a moisture or water is essential to allow hydrogen ions to be moved in the solid polymer electrolyte membrane 1. For this reason, humidifiers 7, 8 are connected, respectively, to the hydrogen supply port 5 and the air supply port 6 in order to prevent the drying out of the solid polymer electrolyte membrane 1. The fuel cell further includes a hydrogen discharge port 9 provided on the lower side of the fuel electrode 2, and an air (oxygen gas) discharge port 10 provided on the lower side of the oxidant electrode 3.

A hydrogen gas obtained by reforming a hydrocarbon-based fuel such as methanol, gasoline or methane gas is introduced into the humidifier 7 on the side of the fuel electrode 2, and an air pressurized up to a predetermined pressure by a compressor (not shown) is introduced into the humidifier 8 on the side of the oxidant electrode 3. The hydrogen gas and the air are humidified by humidifiers 7, 8, and then supplied to the sides of the fuel electrode 2 and the oxidant electrode 3 through the hydrogen supply port 5 and the air supply port 6, respectively. The hydrogen gas and the air supplied to the sides of the fuel electrode 2 and the oxidant electrode 3 cause an electrochemical reaction therebetween to generate an electric power while flowing in parallel with one another along the solid polymer electrolyte membrane 1, and then discharged out of the fuel cell stack 4 through the hydrogen discharge port 9 and the air discharge port 10, respectively.

There is another example of conventional solid polymer electrolyte fuel cells, which was used for Gemini in the 1960s. This solid polymer electrolyte fuel cell uses styrene-based solid polymer as the electrolyte, a pure hydrogen gas as the fuel, and a pure oxygen gas as the oxidant. In this case, an absorbent wick is provided adjacent to the electrodes to absorb and remove any water created in the fuel cell stack during the reaction between the pure hydrogen and the pure oxygen, and to naturally evaporate the absorbed water so as to humidify the interior of the fuel cell stack.

As announced from the American Institute of Aeronautics and Astronautics (AIAA) in 1999, a solid polymer electrolyte fuel cell is employed in the ULDB (Ultra Long Durability Balloon) as a NASA's aeronautical plan for the Stratosphere Platform Project. While this fuel cell also uses a pure hydrogen gas as the fuel, and a pure oxygen gas as the oxidant, any humidifier is omitted to simplify system, and the fuel cell stack is disposed with a slope to allow any water created in the fuel cell stack to be dropped out of the fuel cell stack without recovering.

The former conventional example as shown in FIG. 21 uses air as an oxygen gas source. Thus, if an unreacted gas of the air is re-circulated in the fuel cell stack 4, a nitrogen gas as an inert gas in the air will be accumulated in the fuel cell stack 4, which leads to lowered partial pressure of oxygen and significantly deteriorated fuel-cell characteristics. From this cause, it has been difficult to re-circulate any unreacted gas in the fuel cell stack 4 and provide enhanced oxidant utilization efficiency. Further, it has also been difficult to re-circulate an unreacted gas of the fuel in the fuel cell stack 4, because the re-circulation of the unreacted gas causes the accumulation of $CO_2$ and/or unreformed fuel in fuel cell stack 4, resulting in deteriorated fuel-cell characteristics.

In addition, when air is used as the gas on the side of the oxidant electrode 3, the content of oxygen in the air is about 21%, and consequently about 79% of nitrogen will be supplied to the fuel cell. Thus, the nitrogen as an inert gas is circulated in the fuel cell stack 4 all the time, and the ratio of water vapor is increased up to only 34.7% at 100% of oxygen utilization due to the presence of the nitrogen. When the fuel cell is operated at 50% of utilization ratio of oxygen in the air under normal pressures, it is required to control its operating temperature equal to or less than 59° C., and thereby the allowable range of the operating temperature will be undesirably narrowed.

In consequence of inevitably discharging the air outside, the water created in the fuel cell stack 4 is discharged out of the fuel cell stack 4 together with the air. Thus, the solid polymer electrolyte membrane, particularly the vicinity of the air supply port is apt to dry and have an undesirably reduced region for contributing the reaction. For this reason, it has been required to provide the humidifier 7, 8 in both or either one of the hydrogen supply port 5 and the air supply port 6, resulting in difficulties in downsizing and/or weight reduction of the fuel cell.

On the other hand, the latter conventional example in the ULDB is adapted to allow the water created in the fuel cell stack to be dropped out of the fuel cell stack by. gravitation. Thus, the created water is removed dependent on the dropping speed, resulting in low applicability to high power generation. In addition, the interior of the fuel cell stack is humidified by the natural evaporation of the water absorbed in the wick, without any control of the humidity in the fuel cell stack. Besides, the removed water is directly discharged outside without recovering.

SUMMARY OF THE INVENTION

In view of the above problems, it is therefore an object of the present invention to provide a solid polymer electrolyte fuel cell capable of facilitating improving fuel-cell characteristics and utilization efficiencies of gases on the respective sides of fuel and oxidant electrodes while eliminating the need for providing any humidifier, and reducing in its size, weight and operational cost, with enhanced applicability to high power generation.

In order to achieve the above object, the present invention provides a solid polymer electrolyte fuel cell comprising a fuel cell stack formed by laminating a plurality of fuel cell units each of which includes a fuel electrode, an oxidant electrode, and a solid polymer electrolyte membrane interposed between the fuel and oxidant electrodes, wherein the fuel cell unit is operable to generate an electric power through an electrochemical reaction between a first gas supplied to the side of the fuel electrode and a second gas supplied to the side of the oxidant electrode. In this fuel cell, the first gas supplied to the side of the fuel electrode and the second gas supplied to the side of the oxidant electrode are adapted to flow generally in opposite directions in the fuel cell stack, so that a water created on the side of oxidant electrode is reciprocally moved between the fuel and oxidant electrodes to increase a water holding region in the solid polymer electrolyte membrane.

In a first preferable embodiment of the present invention, the above fuel cell may include a gas supply path for supplying the second gas to the side of the oxidant electrode, and a gas discharge port for discharging at least the second gas from the side of the oxidant electrode. In this case, the gas discharge port is connected to the second gas supply path so as to form a closed circulation path, and a condenser is provided in the closed circulation path. Alternatively, the fuel cell may include a second gas supply port for supplying the second gas from a second gas supply source to the side of the oxidant electrode, and a gas discharge path for discharging at least the second gas from the side of the oxidant electrode. In this case, the gas discharge path and the second gas supply source are connected to a condenser, and the outlet side of the condenser is connected to the second gas supply port, so as to form a closed circulation path. In the above embodiment, the closed circulation path may not be provided on the side of the fuel electrode. In this case, a gas discharge port provided on the side of the fuel electrode is closed.

In a second preferable embodiment of the present invention, the first gas to be supplied to the side of the fuel electrode may be a pure hydrogen gas, and the second gas to be supplied on the side of the oxidant electrode may be a pure oxygen gas.

The fuel cell according to the first embodiment may include a material for containing a condensed water condensed by the condenser, or may include temperature control means for controlling a cooling medium of the condenser in a temperature range of −30° C. to +10° C. with respect to an operating temperature of the fuel cell, or may include flow-volume control means for controlling the volume of the gas circulated through the closed circulation path in the range of 2 to 10 times greater than a theoretical gas volume required for electrochemically generating the electric power In a third preferable embodiment of the present invention, the solid polymer electrolyte membrane may have a thickness of 10 to 50 μm.

The fuel cell according to the first embodiment may include a material for containing a condensed water condensed by the condenser, and the containing means includes means for absorbing the condensed water. Further, the condenser may include a transfer path for allowing the circulation gas in the closed circulation path to be smoothly transferred through the condenser while contacting the absorbing material. The condenser may include a cooling apparatus for cooling the circulation gas in the closed circulation path. In this case, the cooling apparatus is provided separately from the containing material, and the containing material is operable to contain a condensed water condensed by the cooling apparatus. The condenser may include a condensed-water discharge path for compressing the absorbing material to forcibly discharge the condensed water absorbed in the absorbing material out of the condenser. The absorbing material may be adapted to be restored to its original state after the compression, and the condensed-water discharge path may have an operational cycle to be controlled in accordance with a water capacity of the containing material, the number of laminated fuel-cell units of the fuel cell stack, and the quantity of electricity to be generated.

Further, the plural number of the condensers may be provided in parallel with each other.

Furthermore, the closed circulation path may include a bypass path bypassing the condenser.

According to the above fuel cell of the present invention, the first gas supplied to the side of the fuel electrode and the second gas supplied to the side of the oxidant electrode flow in opposite directions in the fuel cell stack, so that the water is reciprocally moved between the fuel and oxidant electrodes through the solid polymer electrolyte membrane. Thus, without providing any humidifier, the water holding region in the solid polymer electrolyte membrane is increased to achieve enhanced fuel-cell characteristics.

BRIEF DESCRIPTION OF THE DRAWINGS

FIG. 14 is a schematic diagram showing another modification of the condenser of the fuel cell according to the second embodiment;

FIG. 15A is a schematic diagram showing still another modification of the condenser of the fuel cell according to the second embodiment, wherein FIG. 15A shows the state when water is absorbed by the condenser.

FIG. 15B is a schematic diagram showing still another modification of the condenser of the fuel cell according to the second embodiment, wherein FIG. 15B shows the state when the water absorbed in the condenser is squeezed out.

FIG. 18A is a schematic diagram showing other modification of the condenser of the fuel cell according to the second embodiment, wherein FIG. 18A shows the state when water is absorbed by the condenser.

FIG. 18B is a schematic diagram showing other modification of the condenser of the fuel cell according to the second embodiment, wherein FIG. 18B shows the state when the water absorbed in the condenser is squeezed out while allowing the oxygen gas to bypass the condenser;

DESCRIPTION OF THE PREFERRED EMBODIMENT

With reference to the drawings, embodiments of the present invention will now be described.

Figure 1:
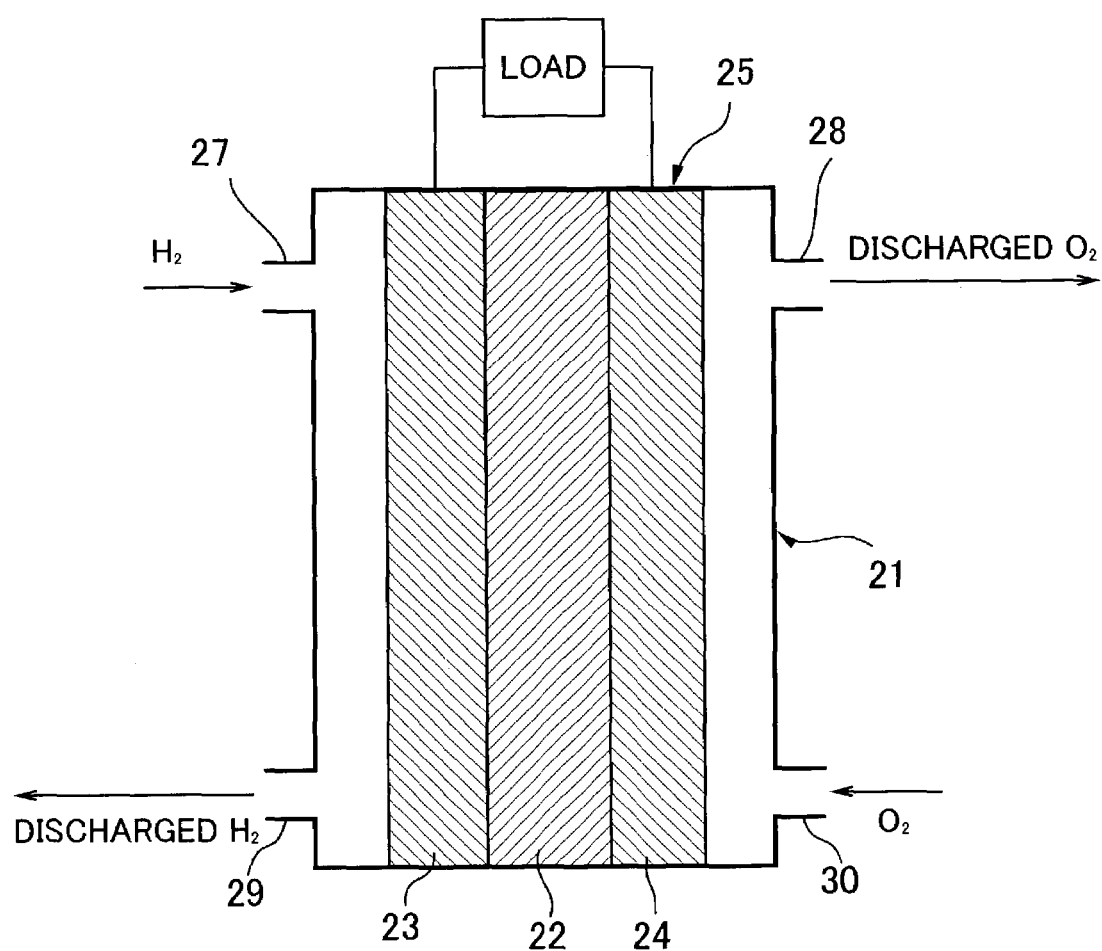
FIG. 1 is a schematic diagram of a solid polymer electrolyte fuel cell according to a first embodiment of the present invention.
Figure 2:
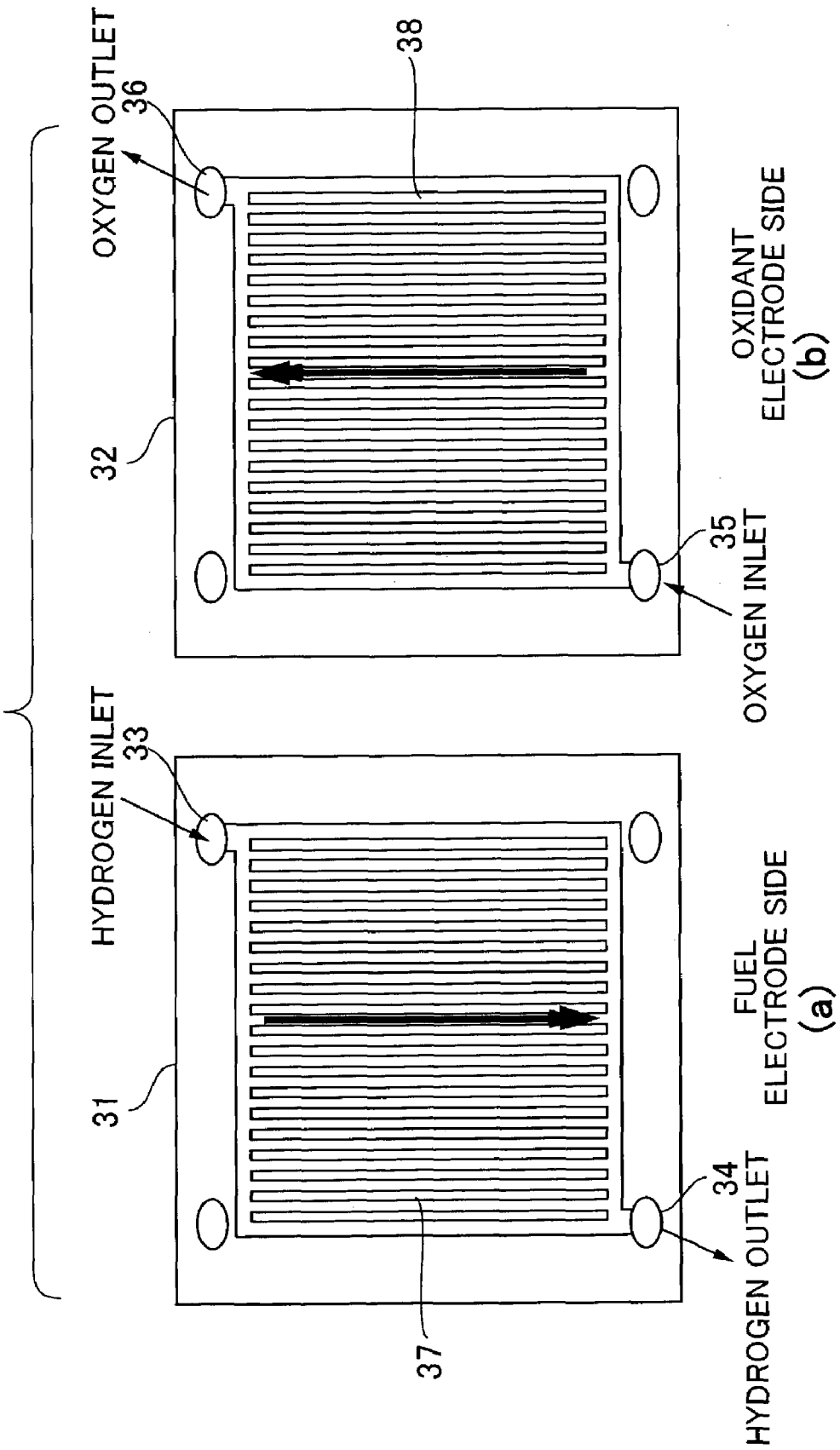
FIG. 2(a) is a front view of a separator of the fuel cell according to the first embodiment.
FIG. 2(b) is a back view of the separator in FIG. 2(a)

FIG. 1 shows a solid polymer electrolyte fuel cell according to a first embodiment of the present invention. The solid polymer electrolyte fuel cell comprises a fuel cell stack 21 formed by stacking a plurality of fuel cell units 25 through a separator 26 (see FIG. 2). Each of the fuel cell units 25 includes a fuel electrode 23, an oxidant electrode 24 disposed opposed to the fuel electrode, and a hydrogen-ion electrolyte membrane 22 interposed between the fuel and oxidant electrodes to allow hydrogen ions to be moved therein. In FIG. 1, only one of the fuel cell units 25 is shown to simplify the following explanation. A hydrogen supply port 27 and an oxygen discharge port 28 are provided on the upper sides of the fuel electrode 23 and the oxidant electrode 24, respectively. A hydrogen discharge port 29 and an oxygen supply port 30 are provided on the lower sides of the fuel electrode 23 and the oxidant electrode 24, respectively. As shown in FIG. 2, the separator 26 is formed in a rectangular flat-plate shape, and composed of a front-side or fuel-electrode-side portion 31 and a back-side or oxidant-electrode-side portion 32. The fuel-electrode-side portion 31 is provided with a hydrogen inlet 33 and a hydrogen outlet 34 correspondingly to the hydrogen supply port 27 and the hydrogen discharge port 29, and the oxidant-electrode-side portion 32 is provided with an oxygen inlet 35 and an oxygen outlet 36 correspondingly to the oxygen supply port 30 and the oxygen discharge port 28. Further, the respective flow channel patterns 37, 38 of the fuel-electrode-side and oxidant-electrode-side portions 31, 32 are comblike in form, so that the hydrogen and oxygen gases flow generally in opposite directions (see the bold arrows in FIG. 2).

Figure 3:
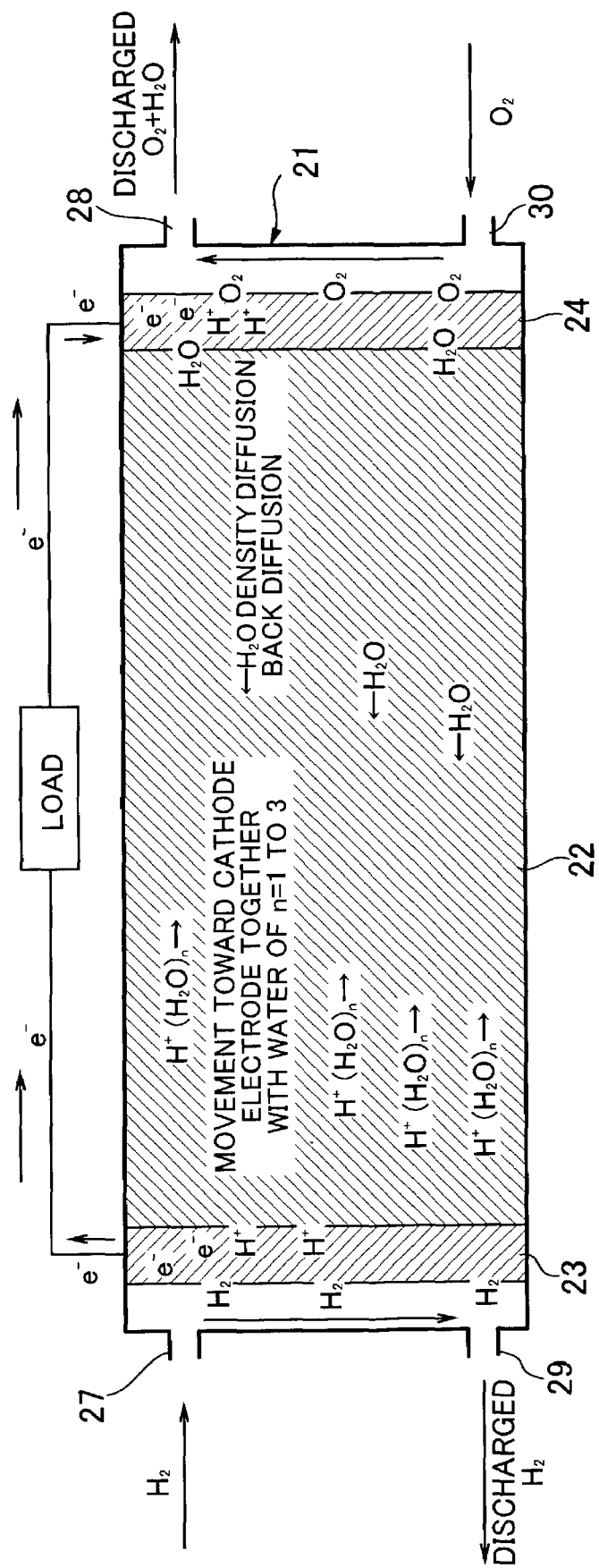
FIG. 3 is an explanatory diagram showing a model of water movement in a fuel cell stack of the fuel cell according to the first embodiment.

In the solid polymer electrolyte fuel cell according to the first embodiment, a pure hydrogen gas and a pure oxygen gas are preferably used as fuel and oxidant, respectively. The pure hydrogen gas is supplied to the side of the fuel electrode 23 through the hydrogen supply port 27, and the pure oxygen gas is supplied to the side of the oxidant electrode 24 through the oxygen supply port 30. After supplied in the fuel cell stack 21, the pure hydrogen and pure oxygen gases flow in opposite directions along the hydrogen-ion electrolyte membrane 22. As shown in FIG. 3, a water created on the side of the oxidant electrode during the reaction between the pure hydrogen and pure oxygen gases is diffusedly moved toward the fuel electrode through the hydrogen-ion electrolyte membrane 22 to humidify the pure hydrogen gas adjacent to the hydrogen supply port 27. The humidified pure hydrogen gas flows in the opposite direction to the flow of the pure oxygen gas, and the amount of water vapor in the pure hydrogen gas is increased as the pure hydrogen gas is consumed. Then, in the vicinity of the hydrogen discharge port 29, the water is moved from the fuel electrode to the oxidant electrode to humidify the vicinity of the oxygen supply port 30. In this manner, the water is reciprocally moved between the oxidant and fuel electrodes through the hydrogen-ion electrolyte membrane 22 in the fuel cell stack 21 so as to increase a water holding region in the hydrogen-ion electrolyte membrane 22 to achieve enhanced fuel-cell characteristics.

Figure 4:
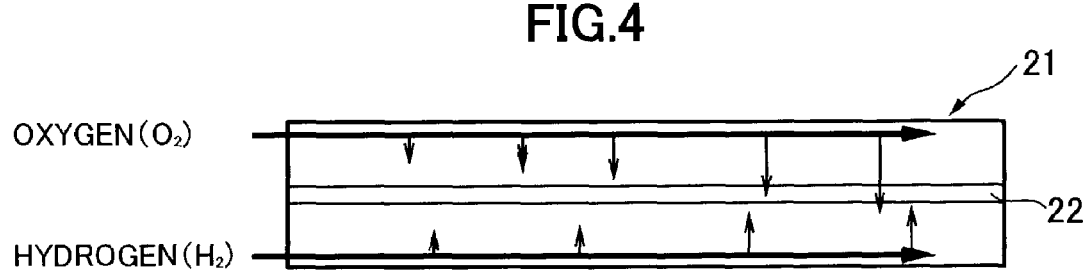
FIG. 4 is an explanatory diagram showing a parallel gas flow in a conventional solid polymer electrolyte fuel cell, wherein oxygen and hydrogen gases flow in parallel directions through a fuel cell stack.
Figure 5:
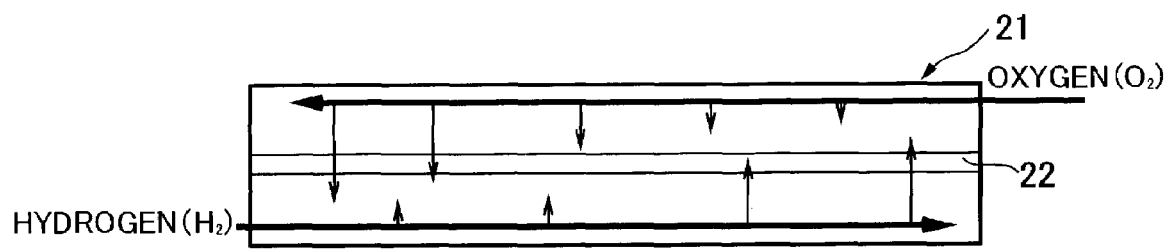
FIG. 5 is an explanatory diagram showing an opposed gas flow in the solid polymer electrolyte fuel cell according to the first embodiment, wherein oxygen and hydrogen gases flow in opposite directions through the fuel cell stack.
Figure 6:
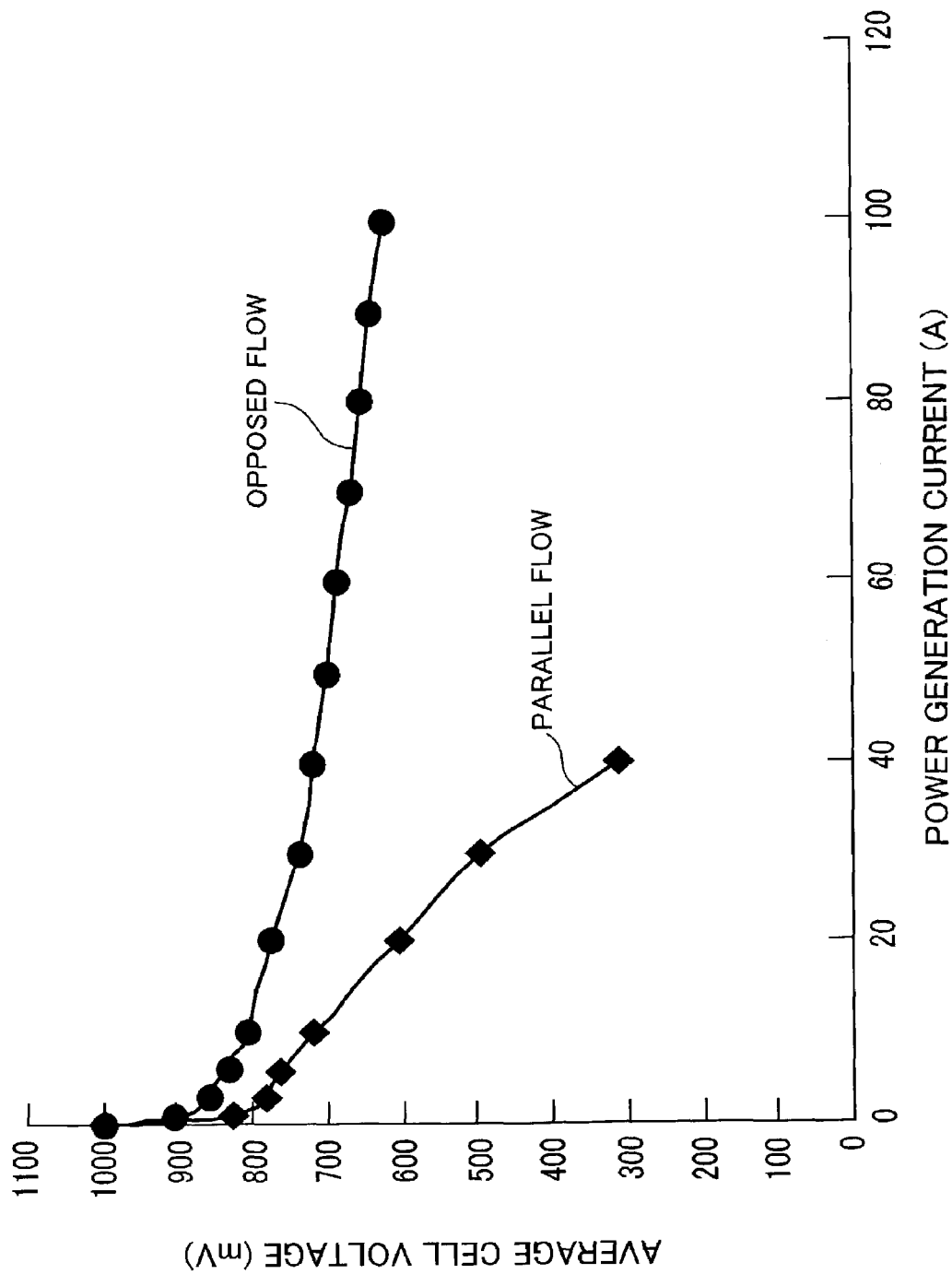
FIG. 6 is a diagram showing respective voltage-current characteristics in the different gas flows.

FIG. 6 shows respective output characteristics of a so-called parallel gas flow type of solid polymer electrolyte fuel cell wherein oxygen and hydrogen gases flow in the same direction along the hydrogen-ion electrolyte membrane 22 (see FIG. 4), and a so-called opposed gas flow type of solid polymer electrolyte fuel cell wherein oxygen and hydrogen gases flow in opposite directions along the hydrogen-ion electrolyte membrane 22 (see FIG. 5). As seen in FIG. 6, in the parallel gas flow type, an average cell voltage is significantly reduced as a load current is increased. By contrast, in the opposed gas flow type, since the water is reciprocally moved between the oxidant electrode 23 and the fuel electrode 24 through the electrolyte membrane 22 to increase the water holding region in the electrolyte membrane 22, the average cell voltage can be stably assured even if the load current is increased.

Figure 7:
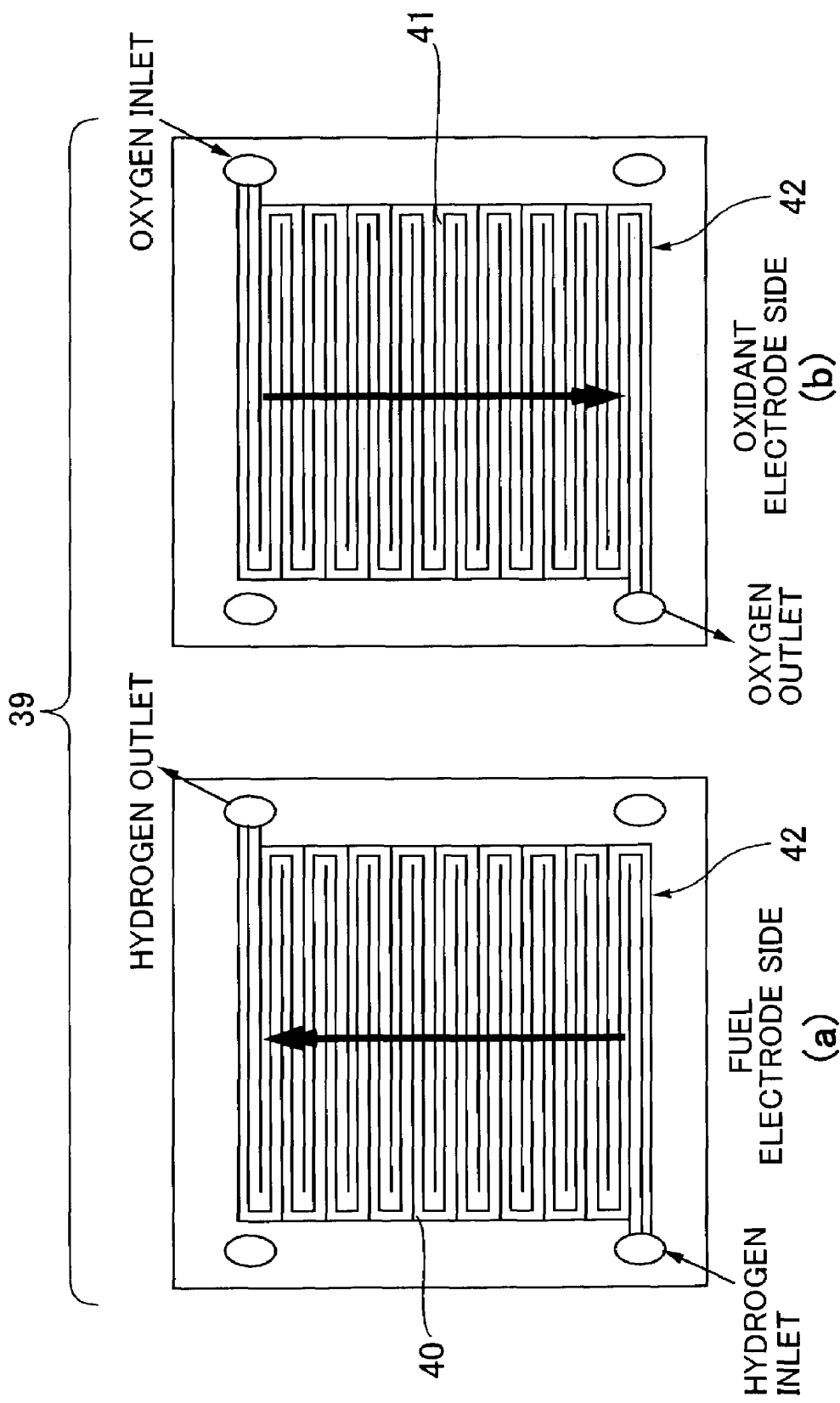
FIG. 7(a) is a front view of a separator for the opposed gas flow in the solid polymer electrolyte fuel cell according to the first embodiment.
FIG. 7(b) is a back view of the separator in FIG. 7(a)

The test data in FIG. 6 was obtained under the conditions that an operating temperature was set at 65° C., and a utilization ratio of the hydrogen and oxygen gases to each of the load currents was set at 30%. The fuel cell stack 21 was formed by stacking four of the fuel cell units 25 each having an effective area of 81 cm$^2$, and a gas-grooved carbon separator 39 (see FIG. 7) was interposed between the fuel cell units. 0.5 mg/cm$^2$ of platinum was contained in each of the fuel electrode 23 and the oxidant electrode 24, and a fluorine-based solid polymer membrane having a solid film of about 30 micrometers thickness formed thereon by using Nafion solution (Aldrich Co., USA) was used as the hydrogen-ion electrolyte membrane 22. The above separator 39 was formed to have serpentine flow-channel patterns 40, 41 as shown in FIG. 7, but to allow the hydrogen and oxygen gases to flow generally in opposite directions (see the bold arrows in FIG. 7). Each of the flow-channel patterns 40, 41 included a groove having a width of 1.5 mm and a depth of 1.0 mm, and a bank having a width of 1.5 mm. Each of the grooved regions 42 was formed in a square shape having one side of 9 cm, and the separator 39 was formed in a square shape having one outer side of 13 cm.

Figure 8:
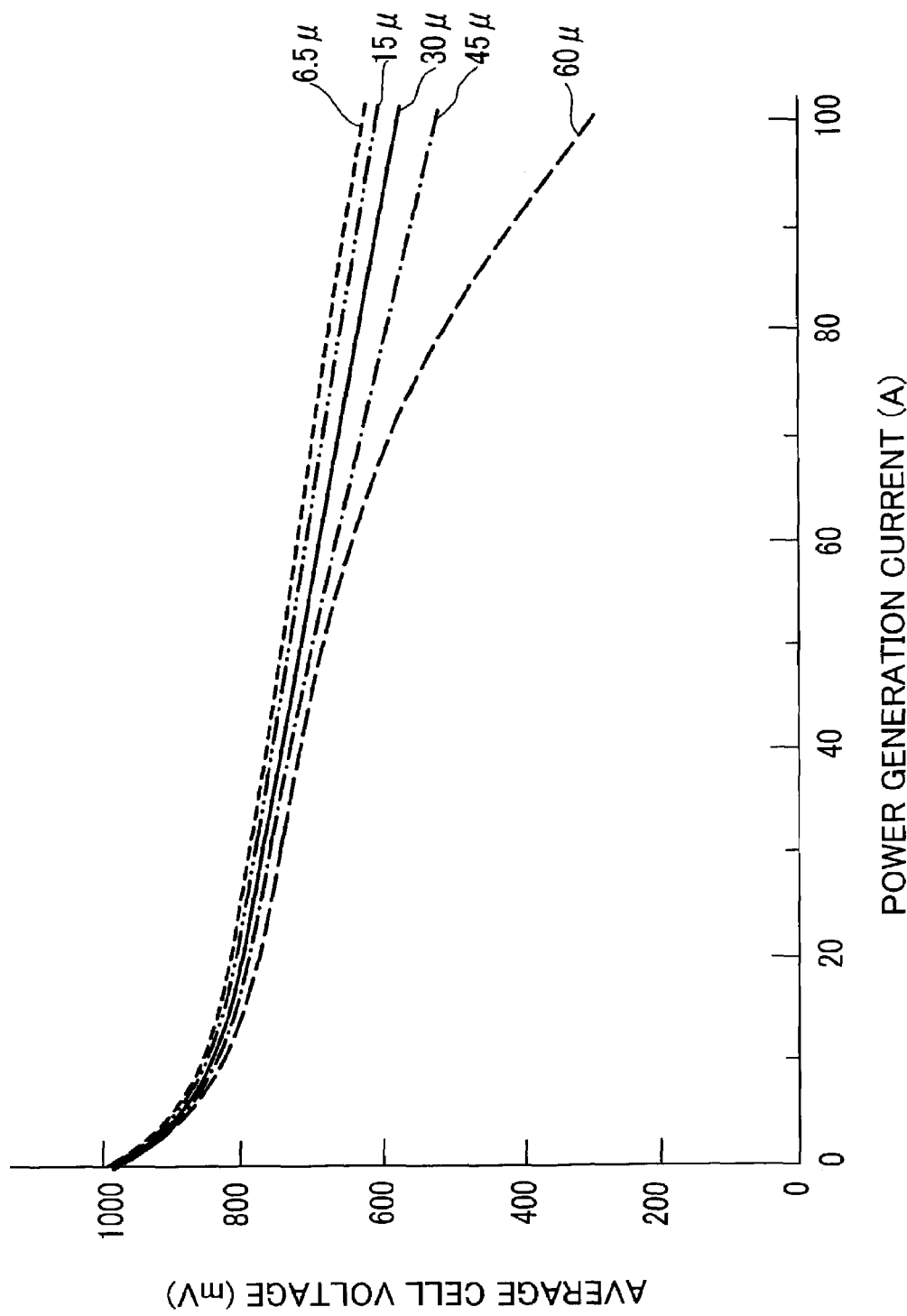
FIG. 8 is a diagram showing respective voltage-current characteristics in different thicknesses of an electrolyte membrane of the fuel cell according to the first embodiment.

FIG. 8 shows a measurement result of average cell voltage-to-power generation current characteristics when the thickness of the electrolyte membrane 22 is variably set at 6.5 micrometers, 15 micrometers, 30 micrometers, 45 micrometers, and 60 micrometers under the same conditions of the test data in FIG. 6. As seen in FIG. 8, in the electrolyte membrane having a thickness of 60 micrometers, the average cell voltage is apt to be significantly reduced if a large power generation current is applied. This phenomenon is caused by the reason that the water cannot be adequately permeated and diffused through the electrolyte membrane in the fuel cell due to the increased thickness of the electrolyte membrane, and the delay of the permeation and diffusion of the water comes to the front particularly at the large power generation current. That is, it was proved that the electrolyte membrane having a thickness of greater than 50 μm causes sharp deterioration in the average cell voltage at the large power generation current. By contract, the fuel cell using the electrolyte membrane having a thickness of 15, 30 or 45 micrometers exhibits an excellent cell voltage characteristic, and exhibits, but not shown in FIG. 8, an excellent result in a test maintained at a constant current. While the fuel cell using the thin electrolyte membrane having a thickness of 6.5 micrometers exhibits an excellent cell characteristic in the range as shown in FIG. 8, the electrolyte membrane was damaged during a early stage of operation of the fuel cell stack due to its weakened mechanical strength, and the hydrogen and oxygen gases easily crossed over to one another in the test maintained at a constant current to cause a direct reaction between the gases and consequently deteriorate the fuel cell voltage. Therefore, the thickness of the electrolyte membrane 22 is preferably set in the range of 10 to 50 micrometers.

Figure 9:
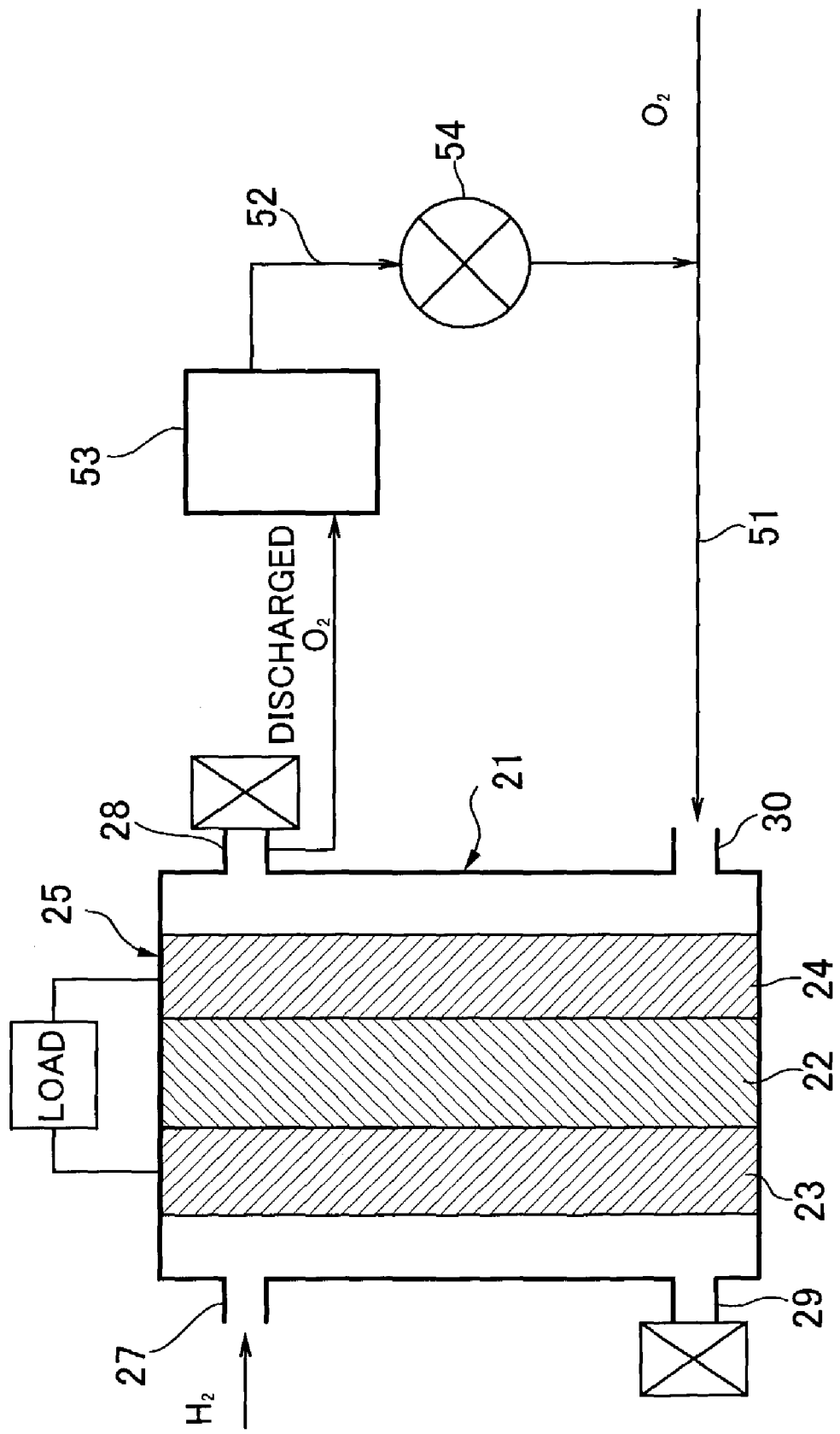
FIG. 9 is a schematic diagram of a solid polymer electrolyte fuel cell according to a second embodiment of the present invention.

With reference to FIG. 9, a solid polymer electrolyte fuel cell according to a second embodiment of the present invention will be described below. For the purpose of simplifying the following explanation, components or elements in FIG. 9 equivalent to those in FIG. 1 are defined by the same reference numerals, and their detailed descriptions will be omitted.

In the solid polymer electrolyte fuel cell according to the second embodiment, the hydrogen discharge port 29 is closed, and the oxygen discharge port 28 on the side of the oxidant electrode 24 is connected to an oxygen supply path 51 connected to the oxygen supply port 30 to form a closed circulation path 52. A condenser 53 and a circulating pump 54 are connected in series with the closed circulation path 52, and a flow-volume control device (not shown) for controlling the flow volume of the gas circulated through the closed circulation path 52 at a predetermined value is provided in the closed circulation path 52.

Figure 10:
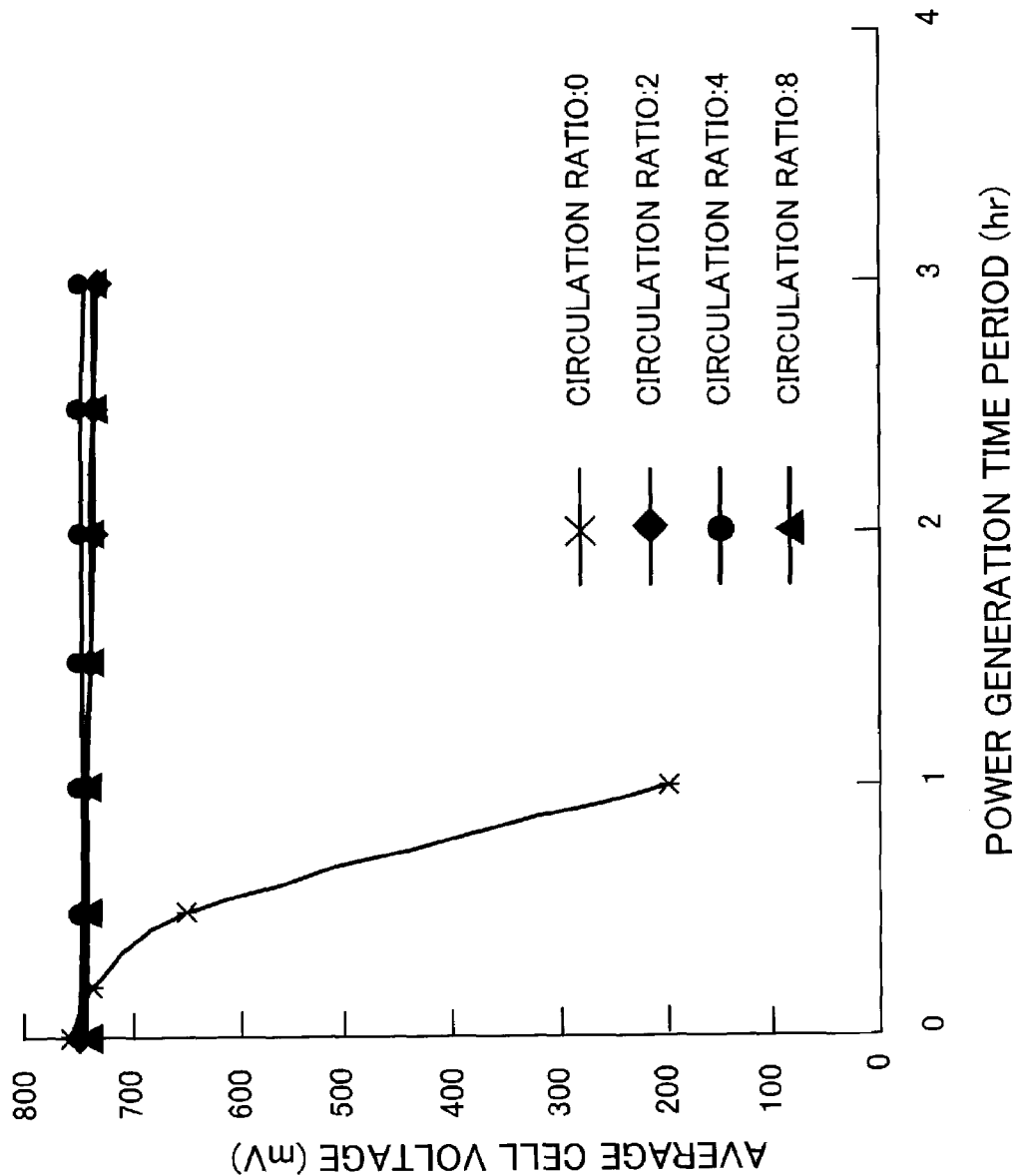
FIG. 10 is a diagram showing respective cell voltage variations vs. elapsed time in different circulation ratios, in the fuel cell according to the second embodiment.
Figure 11:
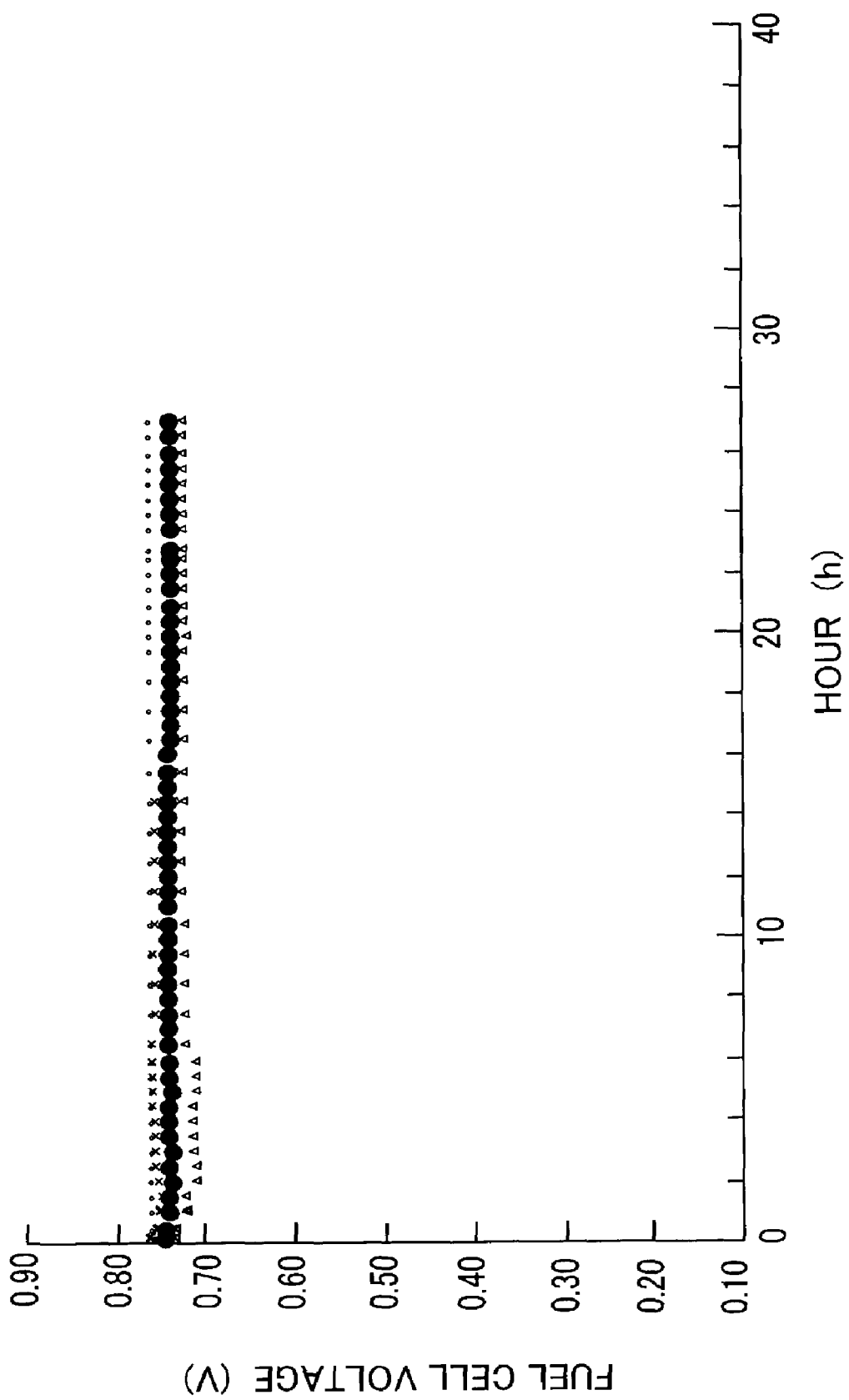
FIG. 11 is a diagram showing a cell voltage variation per hour in a circulation ratio of 4, in the fuel cell according to the second embodiment.

FIG. 10 shows average cell voltage-to-power generation elapsed time (hour) characteristics when an oxygen-gas circulation ratio (the circulation volume of oxygen gas/the theoretical volume of oxygen gas) is variably set at 0, 2, 4 and 8. FIG. 11 shows a fuel cell voltage characteristic in a continuous operation at a load current of 30 A, an oxygen-gas circulation ratio of 4, and an operating temperature of 65° C. As seen in FIGS. 10 and 11, when the oxygen-gas circulation ratio is less than 2, the water is accumulated in the fuel cell stack 21 likely to cause early deterioration in fuel cell characteristics. On the other hand, when the oxygen-gas circulation ratio is greater than 10, the velocity of the circulation gas is excessively increased to complicate the humidity control in the condenser 53 and fuel cell stack. In addition, as the velocity of the circulation gas is increased, the pressure loss in the fuel cell is increased to provide an excessive differential pressure between the respective sides of the hydrogen and oxidant electrodes, which can cause an unexpected occurrence such as the crossover of the hydrogen and oxygen gases. Therefore, the volume of oxygen gas circulated through the closed circulation path 52 is preferably kept in the range of 2 to 10 times greater than the theoretical volume of oxygen gas required for electrochemically generating the electric power.

Figure 12:
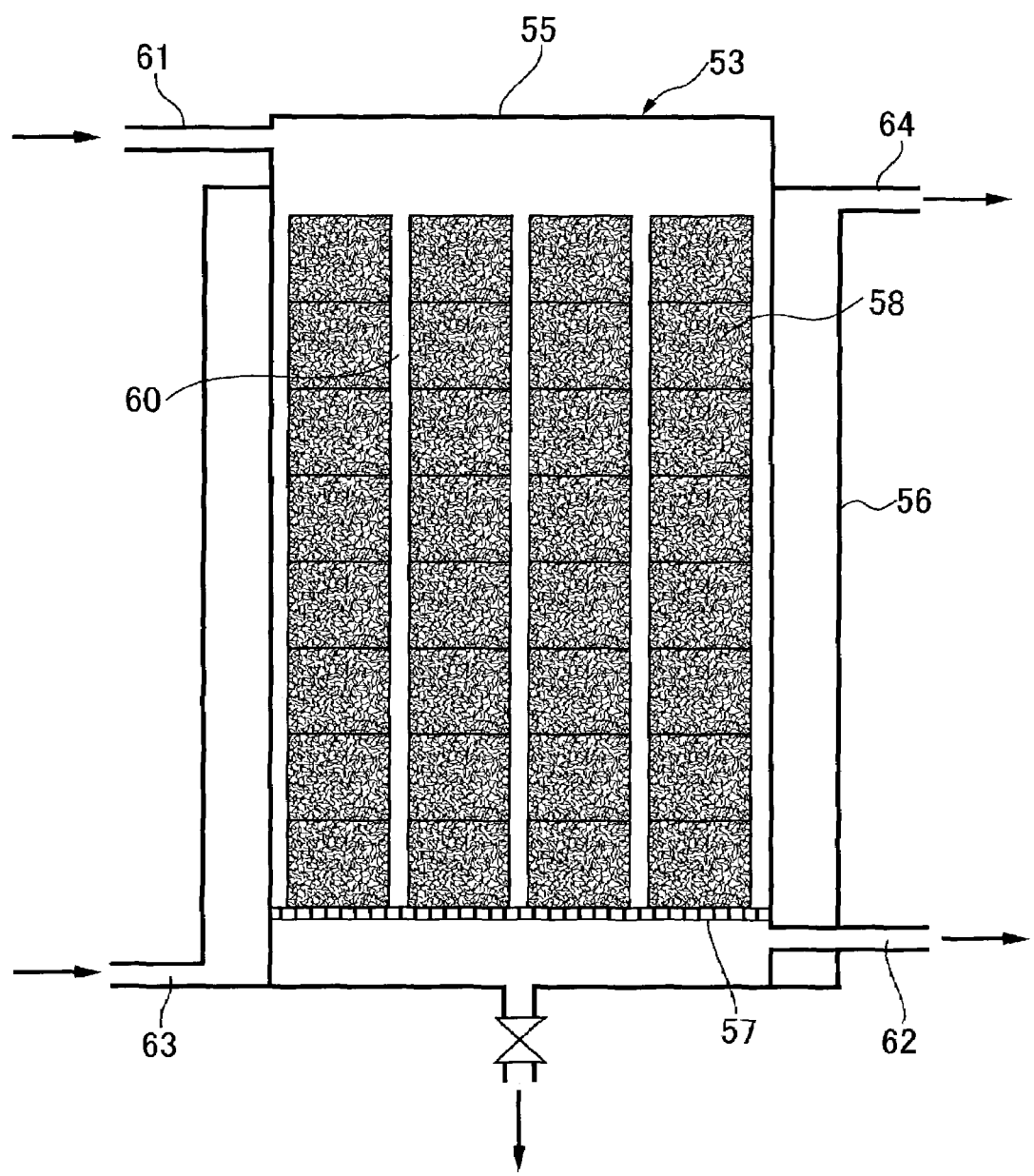
FIG. 12 is a schematic diagram showing a condenser of the fuel cell according to the second embodiment.

As shown in FIG. 12, the condenser 53 comprises a cylindrical container 55, a cooler 56 provided around the outer periphery of the container 55, a perforated plate 57 attached to the inner surface adjacent to the bottom of the container 55, and a cylindrical absorbent member 58 composed of a plurality of absorbent materials laminated on the perforated plate 57. A plurality of communication holes 60 are perforated vertically through the absorbent member 58 to allow the oxygen gas to smoothly flow through the condenser 53 even if the absorbent member 58 absorbs the water. This makes it possible to maintain a stable and high power generation performance. A gas inlet 61 and a gas outlet 62 are provided on the upper and lower sides of the outer periphery of the container 55, respectively. A cooling medium inlet 63 and a cooling medium outlet 64 are provided on the lower and upper sides of the cooler 56. The cooler 56 is also provided with a temperature control device (not shown) for controlling the temperature of cooling medium circulated through the cooler 56 at a predetermined value.

By way of example, in the second embodiment, the container 55 is made of stainless steel, and formed to have a thickness of 0.5 mm, a diameter of 8 cm, and a height of 20 cm. The cooler 56 has an outer diameter of 11 cm. The circulating pump 54 is composed of a diaphragm type pump. The absorbent member 58 is formed to have a diameter of 7.5 cm, a thickness of 15 cm and a porosity of 80%, and made of commercially available nylon nonwoven fabric capable of containing about 500 ml of water. Each of the communication holes 60 has an inner diameter of 4 mm.

Figure 13:
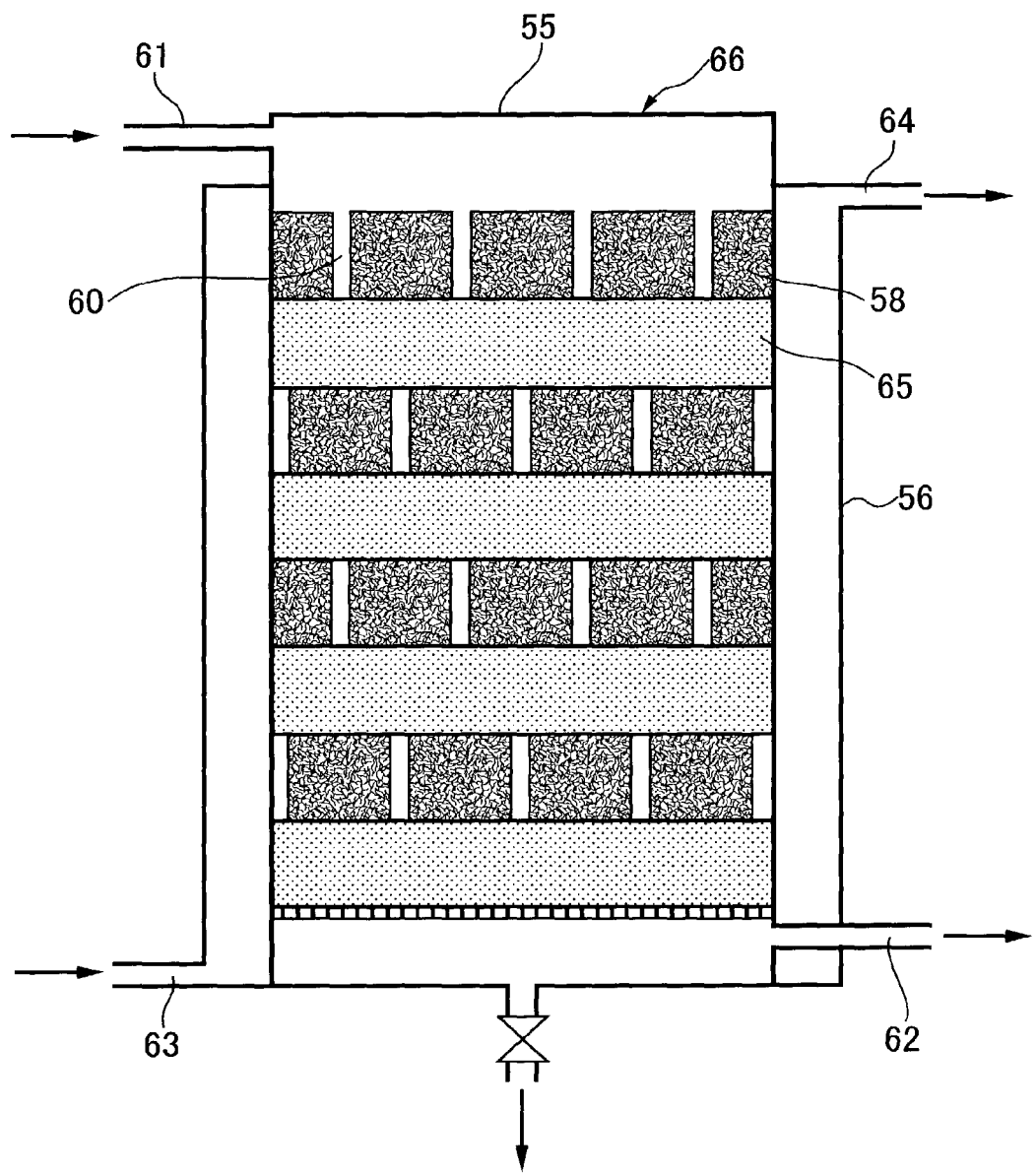
FIG. 13 is a schematic diagram showing one modification of the condenser of the fuel cell according to the second embodiment.

As one alternative of the condenser 53, a condenser 66 as shown in FIG. 13 may be used. The condenser 66 includes a plurality of absorbent members 58 each having a plurality of communication holes 60 perforated vertically at random positions thereof, and a plurality of porous members 65 having low water absorbing property and high gas permeability. The absorbent member 58 and the porous member 65 are alternately laminated in the container 55. In this case, the oxygen gas can be more extensively diffused to bring out enhanced condensing performance.

Alternatively, a condenser 66' as shown in FIG. 14 may be used. The condenser 66' includes a cooling device 67, and a condensed-water containing device 68 provided separately from the cooling device 67. In this case, the cooling device 67 is operable to condense water vapor in the discharged oxygen gas, and the condensed-water containing device 68 is operable to contain the resultingly condensed water. In this case, the function of condensing the water vapor and the function of containing the condensed water are separated. Thus, even if the container 55 has an increased outer diameter to increase the capacity of the condensed water, the cooling device 67 can maintain an adequate cooling efficiency to condense water vapor in the discharged oxygen gas with more enhanced efficiency.

As shown in FIG. 15, the condenser 66 may further include a piston member 69 provided above the absorbent member 58 and adapted to be slidably moved vertically along the inner surface of the container 55. The piston member 69 is operable to compress the absorbent members 58 and the porous members 65 from above at predetermined time intervals or operational cycle so as to squeeze the condensed water contained in the absorbent members 58 and forcibly discharge the condensed water from a discharge port 70 provided at the bottom of the container 55 (see FIG. 15B). After the condensed water is discharged, the piston member 69 is moved upward to its original position, and the absorbent members 58 and the porous members 65 are returned to its original state by their resilience (see FIG. 15A). The operational cycle for discharging the condensed water outside the condenser 66 is determined in accordance with a water capacity of the condenser 66, the number of laminated fuel-cell units of the fuel cell stack, and the quantity of electricity to be generated.

The amount of water to be created in the fuel cell can be logically calculated by the following formula:

water amount (g)=current (A)×current supply time (second)/F×9 (g)×the number of the fuel cell units of the fuel cell stack (wherein F is a Faraday constant of 96500 coulombs (A×second), and 9 (g) indicates the mass of water to be created by one Faraday).

Even if the current and the current supply time is randomly changed, the entire water amount can be determined by using the above formula to calculate respective water amounts for each of the currents and the current supply times, and accumulating the calculated values. Thus, the fuel cell can be continuously operated by setting the water amount within the upper limit of the water capacity of the condenser 66. In this case, the operational cycle of discharging the condensed water can be adequately arranged to prevent any adverse affect on the power generating function of the fuel cell at a large power generating current.

Figure 16:
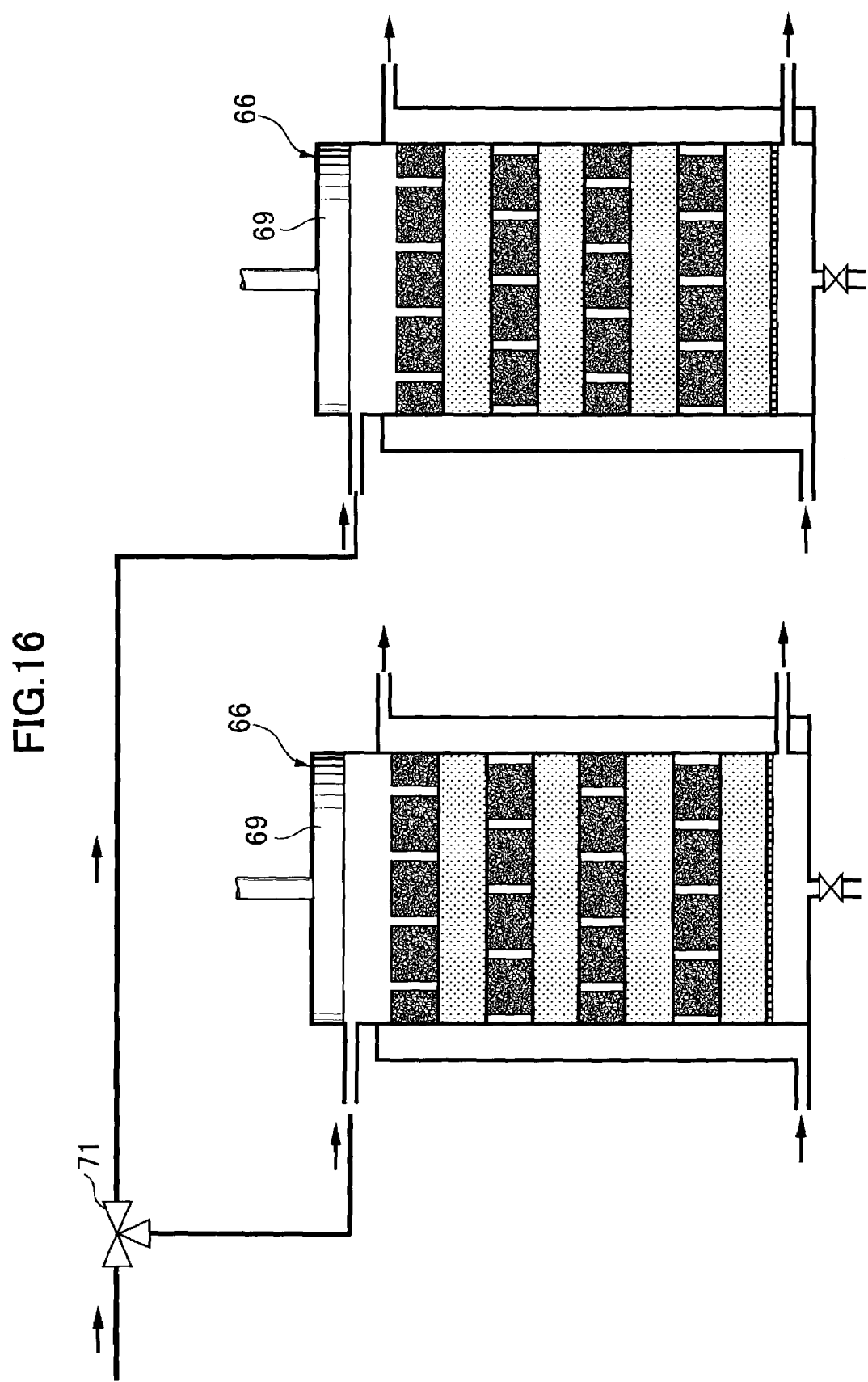
FIG. 16 is a schematic diagram showing yet another modification of the condenser of the fuel cell according to the second embodiment.
Figure 17:
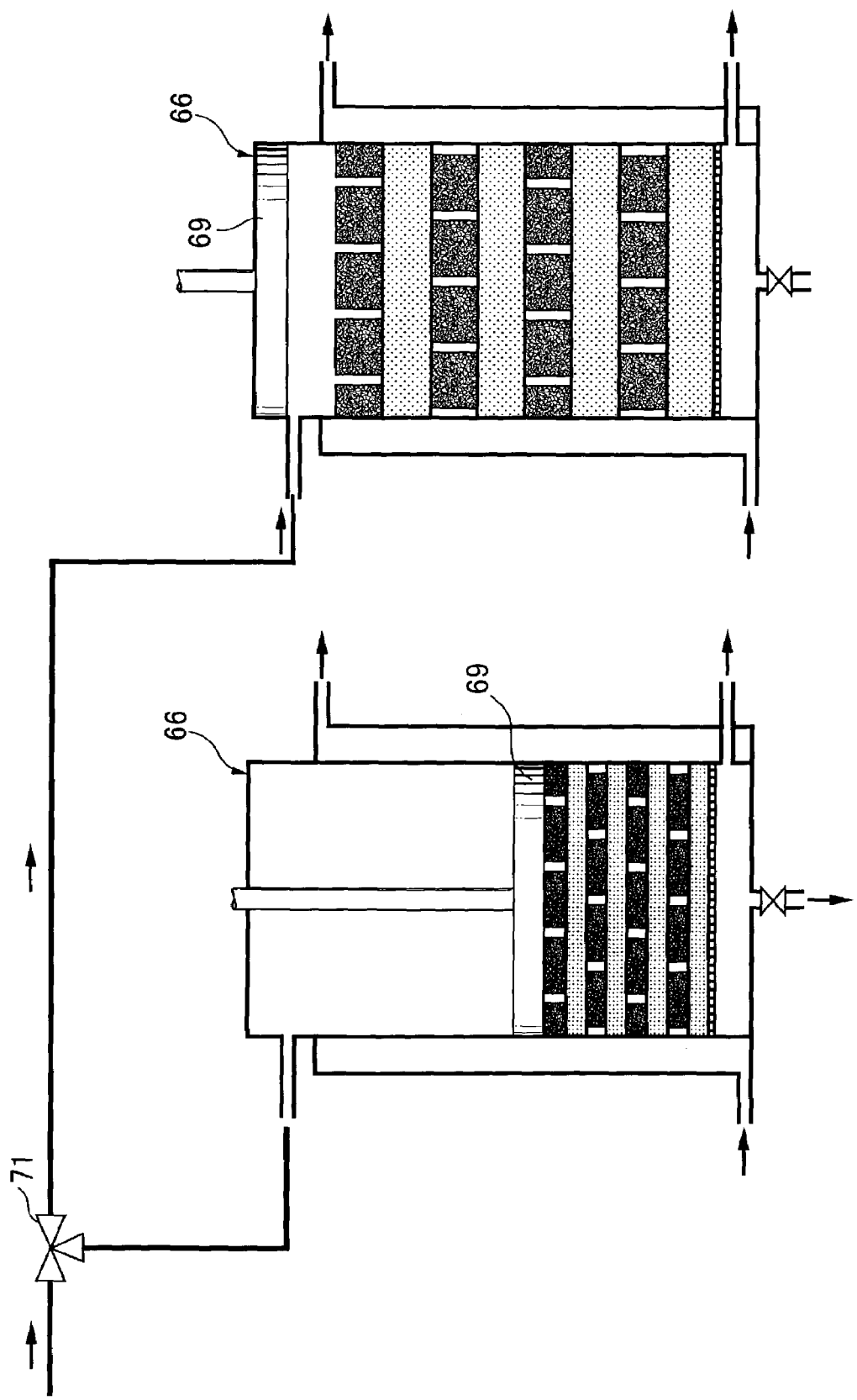
FIG. 17 is a schematic diagram showing yet still another modification of the condenser of the fuel cell according to the second embodiment.

Further, the plural number of the condensers 66, for example, two of the condensers 66 as shown in FIGS. 16 and 17, may be provided. In this case, a control valve 71 is provided on the upstream side of the condensers 66, 66, and the condensers 66, 66 may be independently operated as shown in FIG. 16. Alternatively, as shown in FIG. 17, the respective piston members 69, 69 of the condensers 66, 66 may be operated at different timings, and the control valve 71 may be controlled such that the discharged oxygen gas flows through one of the condensers 66, 66 while operating the piston member 69 of the other condenser 66, so as to continuously condense water vapor in the discharged oxygen gas and remove the condensed water.

Figure 18:
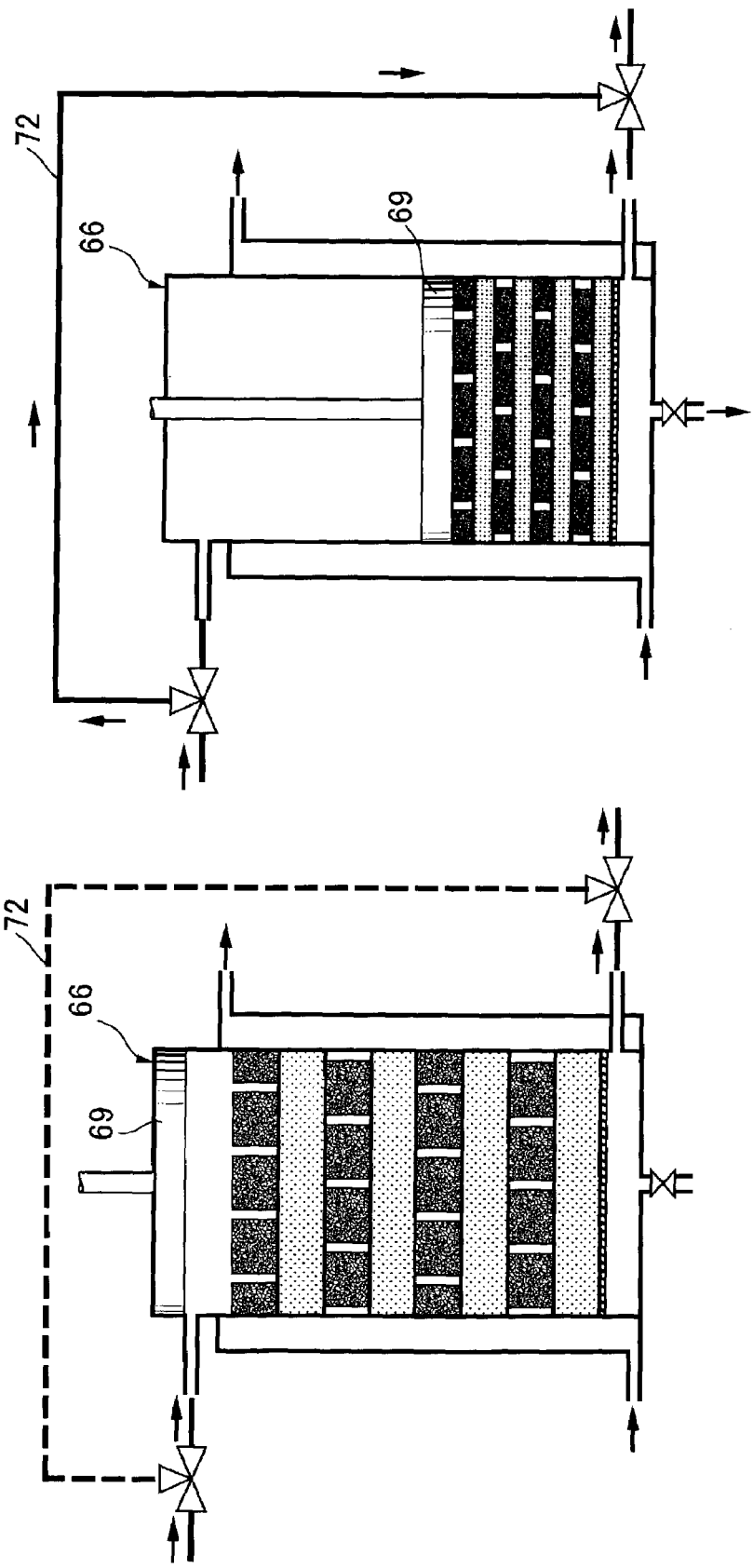

Furthermore, as shown in FIG. 18, a bypass pipe 72 for bypassing the condenser 66 may be provided to return the discharged oxygen gas directly to the fuel cell stack 21 without passing it through the condenser 66 during the operation of discharging the condensed water from the condenser 66, preferably for a short time period (see FIG. 18B).

In the second embodiment, the absorbent member 58 is made of nylon nonwoven fabric. However, the absorbent member 58 may be made of any suitable material having excellent absorbability such as woven or nonwoven fabric of rayon, natural fiber or the like. Further, the cooling medium of the cooler 56 may be selected from the group of water, ammonia water, ethylene glycol and mineral oil, according to use conditions. Furthermore, the inner surface of the container 55 containing the absorbent member 58 may be formed with concave and convex portions to provide an increased heat conduction area.

Figure 19:
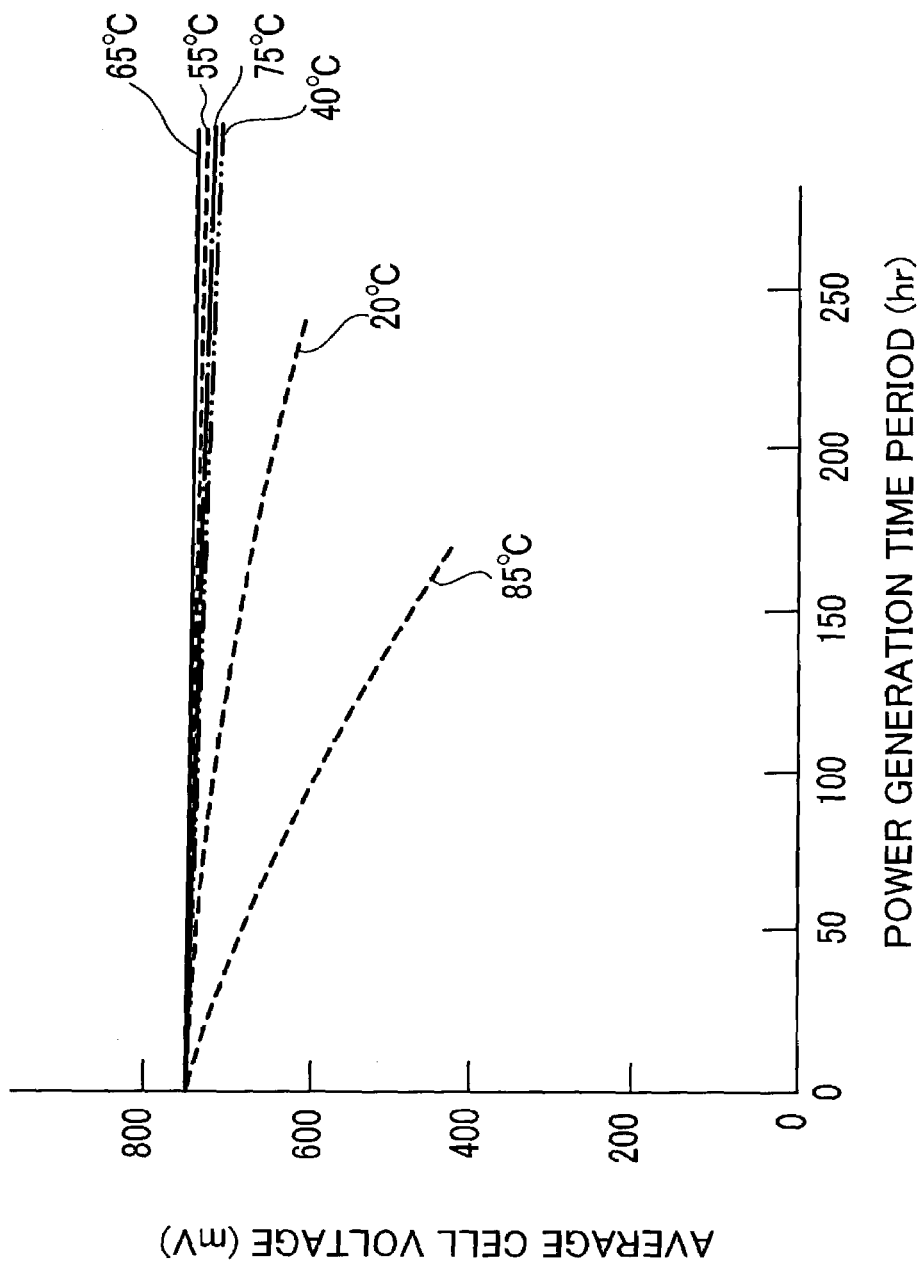
FIG. 19 is a diagram showing respective time-base cell voltage variations in different temperatures of a cooling water, in the fuel cell according to the second embodiment.

FIG. 19 shows a measurement result of average cell voltage, when the fuel cell stack 21 having the same specifications as those of the first embodiment was operated at an operating temperature of 65° C., a current of 30A and an oxygen-gas circulation ratio of 4, with the condenser 66' separately having the cooling device 67 and the condensed-water containing device 68 (see FIG. 14) and using water as its cooling medium, and the temperature of the cooling water was variably set at 20° C., 40° C., 55° C., 65° C., 75° C. and 85° C. According to this measurement result, when the cooling water temperature was set at 20° C., the electrolyte membrane was dried and thereby the average cell voltage was gradually reduced. When the cooling water temperature was set at 85° C., the electrolyte membrane was excessively wetted and consequently the adjacent catalyst layer and the separator on the outside thereof were wetted, so that a so-called flooding phenomenon of deteriorating the diffusion of the reaction gases into the electrolyte membrane was cause to reduce the average cell voltage. No significant reduction of the average cell voltage was observed at another cooling water temperature. Thus, it was proved that a relatively excellent time-based characteristic can be obtained by setting the cooling water temperature in the range of −30° C. to +10° C. with respect to the operating temperature of the fuel cell. In addition, it was experientially proved that the cooling water is preferably set at higher temperature for lager oxygen-gas circulation ratio and at lower temperature for smaller oxygen-gas circulation ratio.

The operation of the solid polymer electrolyte fuel cell according to the second embodiment will be described below.

As with the first embodiment, the solid polymer electrolyte fuel cell according to the second embodiment uses a pure hydrogen gas as the fuel and a pure oxygen gas as the oxidant. The pure hydrogen and pure oxygen gases supplied into the fuel cell stack 21 flow in opposite directions along the hydrogen-ion electrolyte membrane 22 to generate electric power. In this case, since the hydrogen discharge port 29 is closed, the utilization ratio of the pure hydrogen gas will be approximately 100%. After reacting with the hydrogen gas, the pure oxygen gas is controlled at a predetermined flow volume by the flow-volume control device, and supplied into the condenser 53 through the oxygen discharge port 28, the closed circulation path 52 and the gas inlet 61. Then, the cooler 56 cools the discharged pure oxygen gas supplied into the condenser 53 down to a predetermined temperature to condense water vapor in the discharged pure oxygen gas and create a condensed water. The condensed water is absorbed in the absorbent member 58 while the discharged pure oxygen gas passes through the communication holes 60. The discharged pure oxygen gas discharged outside the condenser 53 through the gas outlet 62 is forcibly supplied from the closed circulation path 52 to the oxygen supply path 51 by the circulating pump 54. Then, the discharged pure oxygen gas is mixed with the pure oxygen gas from the pure-oxygen-gas supply source, and returned to the side of the oxidant electrode 24 through the oxygen supply port 30.

As above, by closing the hydrogen discharge port 29 and forming the closed circulation path 52 on the side of the oxidant electrode 24, both the utilization ratios of the hydrogen and oxygen gases will be approximately 100%. In addition, by controlling the circulation volume and temperature of the oxygen gas, the humidity of the electrolyte membrane can be maintained in a predetermined range while preventing the water created by the reaction between the oxygen and hydrogen gases from being accumulated in the interior of the fuel cell stack 21.

Further, the water created during the power generation is contained in the condenser, and the amount of the water is adequately controlled. Thus, the fuel cell can efficiently generate electric power without accumulation of the water on the electrolyte membrane and occurrence of the flooding phenomenon. The condensed water absorbed in the absorbent member 58 of the condenser 53 or 66 can be used as drinking water in a closed environment such as outer space, or reused for power generation by creating hydrogen and oxygen gases through an electrolytic process.

The aforementioned condenser 53, 66 or 66' can efficiently remove the water excessively created through the power generation at a large current to maintain the adequate power generation performance of the fuel cell. The absorbent member 58 provided in the condenser 53, 66 or 66' can prevent the condensed water from floating in the condenser 53, 66 or 66' even under very low gravity as in outer space to achieve a stable power generation.

In the above embodiment, the circulation gas having a desired humidity is re-supplied to the fuel cell stack 21 by adequately controlling the temperature of the cooling medium of the condenser power generation and adjusting the partial pressure of the water vapor of the circulation gas re-supplied to the fuel cell stack 21 through the closed circulation path 52. Thus, the amount of the water to be removed at the condenser 53, 66 or 66' and the amount of the circulation gas can be controlled in a well-balanced manner. This can prevent occurrence of a dry-out phenomenon caused by excessively removing the water in the fuel cell stack 21, drying the electrolyte membrane 22 and blocking the transmission of hydrogen ions, so as to provide enhanced power generation performance.

Further, since the oxygen gas is used as the oxidant, the gas circulation allows 100% of the supply gas to be utilized. Further, the partial pressure of the water can be freely changed by adjusting the oxygen-gas circulation ratio, and thereby the allowable range of the operating temperature of the fuel cell can be enlarged. For example, when the fuel cell is operated at an oxygen-gas circulation ratio of 2, the allowable operating temperature can be increased up to 87° C.

While the closed circulation path of the above embodiment is provided on the side of the oxidant electrode 24, the closed circulation path 52 may be provided on either one side or both sides of the fuel electrode 23 and the oxidant electrode 24. However, it is preferable to provide the closed circulation path 52 on at least the side where the water is created, specifically, on the side of the oxidant electrode 24 when the hydrogen-ion electrolyte membrane 22 is used, or on the side of the fuel electrode 23 when a hydroxide-ion or carbonate-ion electrolyte membrane is used.

Figure 20:
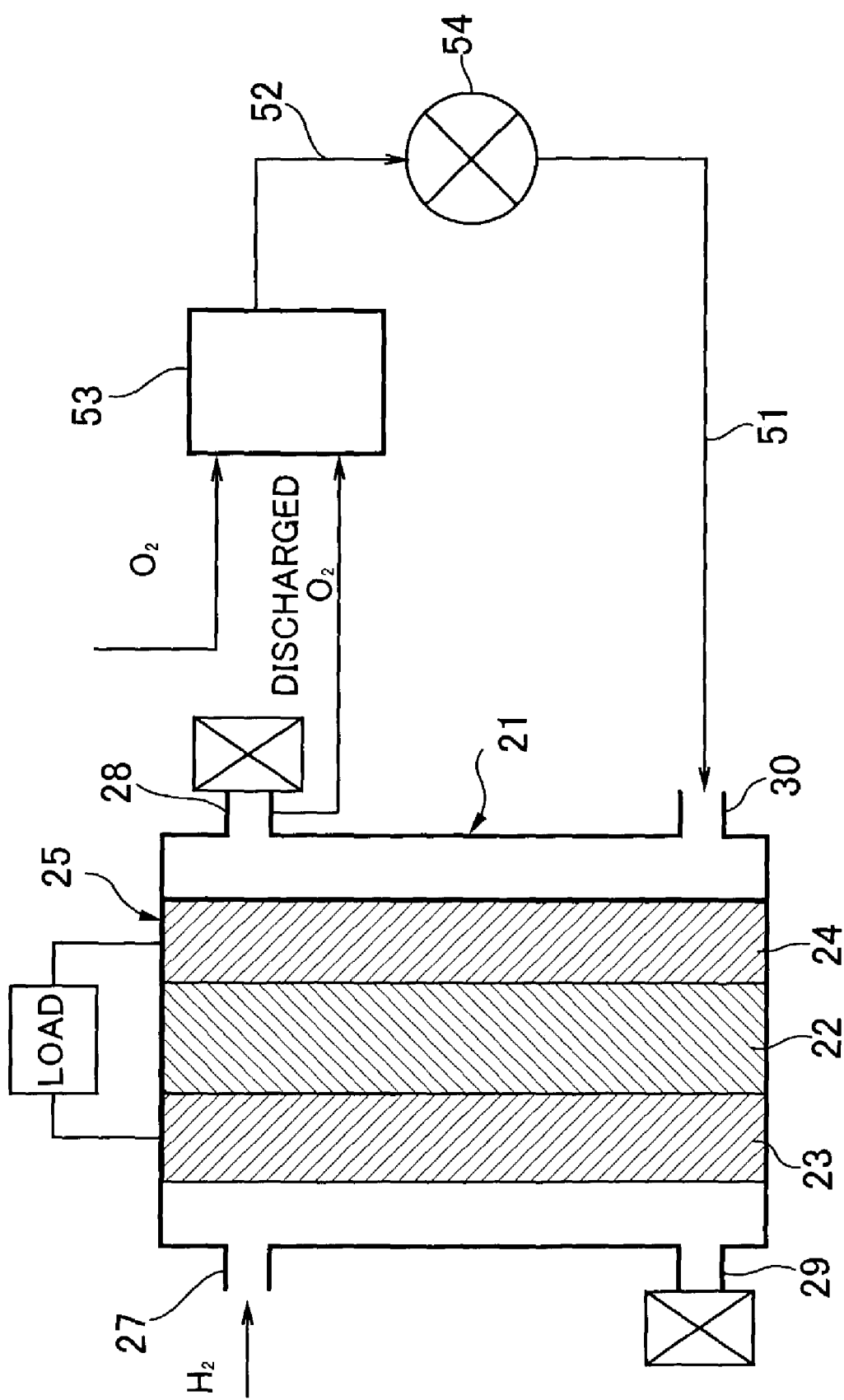
FIG. 20 is a schematic diagram of one modification of the fuel cell according to the second embodiment.
Figure 21:
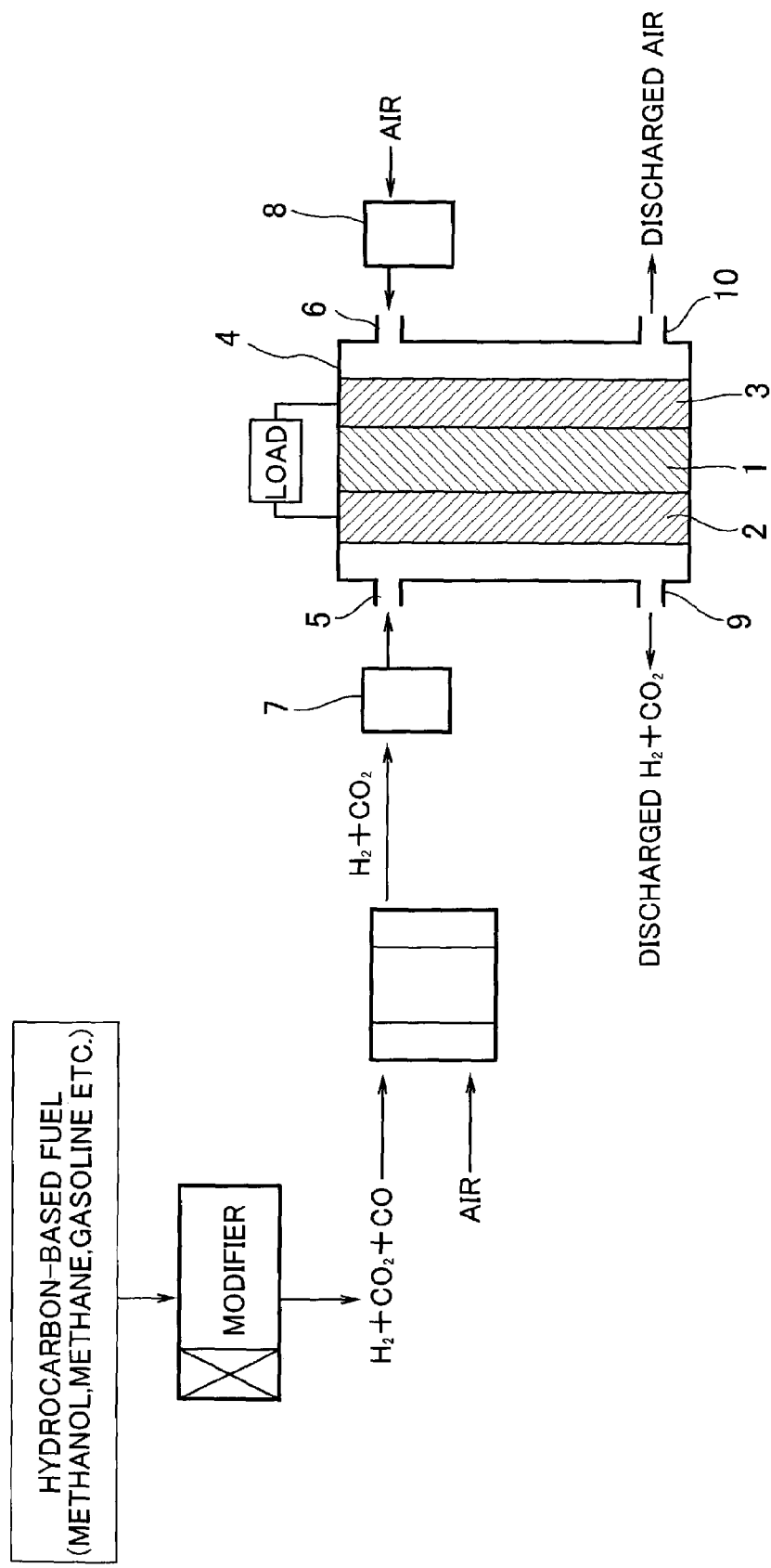
FIG. 21 is a schematic diagram showing a conventional solid polymer electrolyte fuel cell.

Further, as shown in FIG. 20, the oxygen-gas supply source may be connected to the inlet side of the condenser 53. In this case, the relationship between the oxygen-gas circulation amount and the fuel cell characteristic was the same as that of the above embodiment. In addition, this construction is advantageously capable of more easily controlling the humidity of the oxygen gas to be circulated to the interior of the fuel cell stack 21, and adequately operating the fuel cell while reducing the temperature of the condenser 53 by 5 to 10° C.

As mentioned above, according to the present invention, the first gas supplied to the side of the fuel electrode and the second gas supplied to the side of the oxidant electrode flow in opposite directions in the fuel cell stack, so that the water is reciprocally moved between the fuel and oxidant electrodes through the solid polymer electrolyte membrane. Thus, without providing any humidifier, the water holding region in the solid polymer electrolyte membrane is increased to achieve enhanced fuel-cell characteristics.

In addition, since the need for providing a humidifier is eliminate, the fuel cell can be reduced in size and/or weight. Further, the closed circulation path may be formed and/or the port for discharging the gas from the fuel cell stack may be closed to provide enhanced utilization ratios of the gases on the respective sides of the fuel and oxidant electrodes.

Furthermore, the flow volume and/or temperature of the circulation gas in the closed circulation path may be controlled to control the humidity in the fuel cell stack so as to provide various excellent effects such as improvement of fuel cell performance, reduction of operational cost, and higher power generation.

What is claimed is:

1. A solid polymer electrolyte fuel cell comprising a fuel cell stack comprising a plurality of fuel cell units laminated together, wherein each of the plurality of fuel cell units includes:
    a fuel electrode,
        first gas supply means for supplying a first gas to the side of said fuel electrode, an oxidant electrode,
        a second gas supply path for supplying a second gas to the side of said oxidant electrode,
        a solid polymer electrolyte membrane interposed between said fuel and oxidant electrodes, said solid polymer electrolyte membrane having a water holding region,
        first means for flowing said first gas in parallel flow paths in a first direction in said fuel cell stack and second means for flowing said second gas in parallel flow paths in a second direction in said fuel cell stack, said first and second directions being generally opposite and parallel, whereby water created on the side of said oxidant electrode is reciprocally moved between said fuel and oxidant electrodes to increase the water holding region in said solid polymer electrolyte membrane,
    a condenser,
    a gas discharge port for discharging at least said second gas from the side of said oxidant electrode, wherein said gas discharge port is connected to said second gas supply path so as to form a closed circulation path, and said condenser is provided in said closed circulation path, and
    containing means for containing condensed water condensed by said condenser, said containing means including absorbing means for absorbing the condensed water,
    condensed-water discharge means included in said condenser for compressing said absorbing means to forcibly discharge the condensed water absorbed in said absorbing means out of said condenser,
    wherein the first gas and the second gas are reactable with each other electrochemically in each fuel cell unit to generate electric power while flowing in parallel with one another along said solid polymer electrolyte membrane.

2. A solid polymer electrolyte fuel cell as defined in claim 1, wherein said absorbing means is restorable to its original state after the compression.

3. A solid polymer electrolyte fuel cell as defined in claim 2, wherein said condensed-water discharge means has an operational cycle controllable in accordance with the water capacity of said containing means, the number of laminated fuel-cell units of said fuel cell stack, and the quantity of electricity to be generated.

4. A solid polymer electrolyte fuel cell as defined in claim 2, wherein more than one said condenser is provided and said condensers are provided in parallel with each other.

* * * * *

UNITED STATES PATENT AND TRADEMARK OFFICE
CERTIFICATE OF CORRECTION

PATENT NO. : 7,273,672 B2 Page 1 of 1
APPLICATION NO. : 10/386470
DATED : September 25, 2007
INVENTOR(S) : Yoshitsugu Sone et al.

It is certified that error appears in the above-identified patent and that said Letters Patent is hereby corrected as shown below:

Title Page item 73
In the listing of the Assignee, change the address from "Tsukuba-Shi, Inaraki (JP)"

to -- Chofu-shi, Tokyo (JP) --.

Signed and Sealed this

Fourth Day of May, 2010

David J. Kappos
*Director of the United States Patent and Trademark Office*